(12) United States Patent
Mai

(10) Patent No.: US 7,717,604 B2
(45) Date of Patent: *May 18, 2010

(54) OPTIC FILM OF SIDE-EDGE BACKLIGHT MODULE

(75) Inventor: Chien-Chin Mai, No. 6, Gongye 2nd Rd., Renwu Shiang, Kaohsiung County 814 (TW)

(73) Assignees: Chien-Chin Mai, Kaohsiung County (TW); Gamma Optical Co., Ltd., Kaohsiung County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/567,229

(22) Filed: Dec. 6, 2006

(65) Prior Publication Data

US 2007/0230178 A1 Oct. 4, 2007

(30) Foreign Application Priority Data

Mar. 31, 2006 (TW) .............................. 95111554 A

(51) Int. Cl.
*F21V 7/00* (2006.01)
(52) U.S. Cl. ...................................... 362/620; 362/626
(58) Field of Classification Search ................. 362/600, 362/610, 616, 620, 626; 349/56–71; 385/146, 385/901

See application file for complete search history.

(56) References Cited

U.S. PATENT DOCUMENTS

| | | | | |
|---|---|---|---|---|
| 6,354,709 | B1 * | 3/2002 | Campbell et al. | 362/627 |
| 6,845,212 | B2 * | 1/2005 | Gardiner et al. | 385/146 |
| 7,404,659 | B2 * | 7/2008 | Mai | 362/606 |
| 2005/0237641 | A1 * | 10/2005 | Tang | 359/831 |
| 2005/0243561 | A1 * | 11/2005 | Etori | 362/331 |

* cited by examiner

Primary Examiner—Jong-Suk (James) Lee
Assistant Examiner—Julie A Shallenberger
(74) Attorney, Agent, or Firm—Leong C. Lei

(57) ABSTRACT

A side-edge backlight module includes at least a light guide board, a reflector film, a plurality of optic films and a light source. The optic film has a surface on which a plurality of rib-like micro light guides is formed. Each micro light guide includes a plurality of ridges, which are of different heights and show variation of height. Either a high ridge or a low ridge of the micro light guide is made a continuous left-and-right wavy configuration and/or a continuous up-and-down height-variation configuration. Thus, light transmitting through the optic film and converged by the micro light guides leaves the optic film in a form that is not very regular so as to facilitate subsequent use of the light in for example a liquid crystal display panel.

4 Claims, 33 Drawing Sheets

OPTIC FILM OF SIDE-EDGE BACKLIGHT MODULE

BACKGROUND OF THE INVENTION (a) Technical Field of the Invention

The present invention relates to an optic film of a side-edge backlight module, and in particular to a structure of optic film that allows light transmitting therethrough to leave in an irregular manner to facilitate subsequent use of the light.

(b) Description of the Prior Art

Conventional backlight modules have been of such an improvement that a light source supplied by the conventional backlight module is effectively converted from a linear light source into a surface light source. However, the light source is still subject to the constraints imposed by the regularity of prism ribs formed on an optic film that constitutes in part the backlight module. Thus, light from the conventional backlight modules is emitted in the form of regular straight beam. On the other hand, a liquid crystal display panel comprises thin-film transistors and color filters which are of minute matrix arranged in an opposing manner. Thus, when the regular straight beam passes through gaps between units of thin-film transistors and the color filters, diffraction of light occurs, which forms interference patterns in the liquid crystal display panel.

Occurrence of the interference patterns in a specific liquid crystal panel cannot be identified in the site of backlight module manufacturers, and can only be found when a liquid crystal panel in which the backlight module is mounted is actuated. This often causes problems between the backlight module suppliers and the manufacturers of liquid crystal display panels, and is a trouble of pressing need to be overcome.

Therefore, it is desired to provide an optic film for a side-edge backlight module that overcomes the problems discussed above.

SUMMARY OF THE INVENTION

The primary purpose of the present invention is to provide an optic film that has a surface on which a plurality of rib-like micro light guides is formed. Each light guide comprises at least two ridges, which are of different heights, wherein either one of a high ridge and a low ridge of the light guide is made a continuous left-and-right wavy configuration and/or a continuous up-and-down height-variation configuration. Thus, light transmitting through the optic film is not of a regular linear form and contains a beam of continuous curving so as to eliminate induction of interference pattern in for example a liquid crystal display panel.

Another objective of the present invention is to provide an optic film of a side-edge backlight module, wherein the optic film has a surface on which a plurality of rib-like micro light guides is formed. Each light guide comprises at least two ridges, which are of an identical height, wherein each one ridge of the light guide is made, wholly or in part, a continuous left-and-right wavy configuration and/or a continuous up-and-down height-variation configuration. Thus, light transmitting through the optic film is not of a regular linear form and contains a beam of continuous curving so as to eliminate induction of interference pattern in for example a liquid crystal display panel.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

The present invention will be apparent to those skilled in the art by reading the following description of preferred embodiments thereof, with reference to the attached drawings, wherein.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
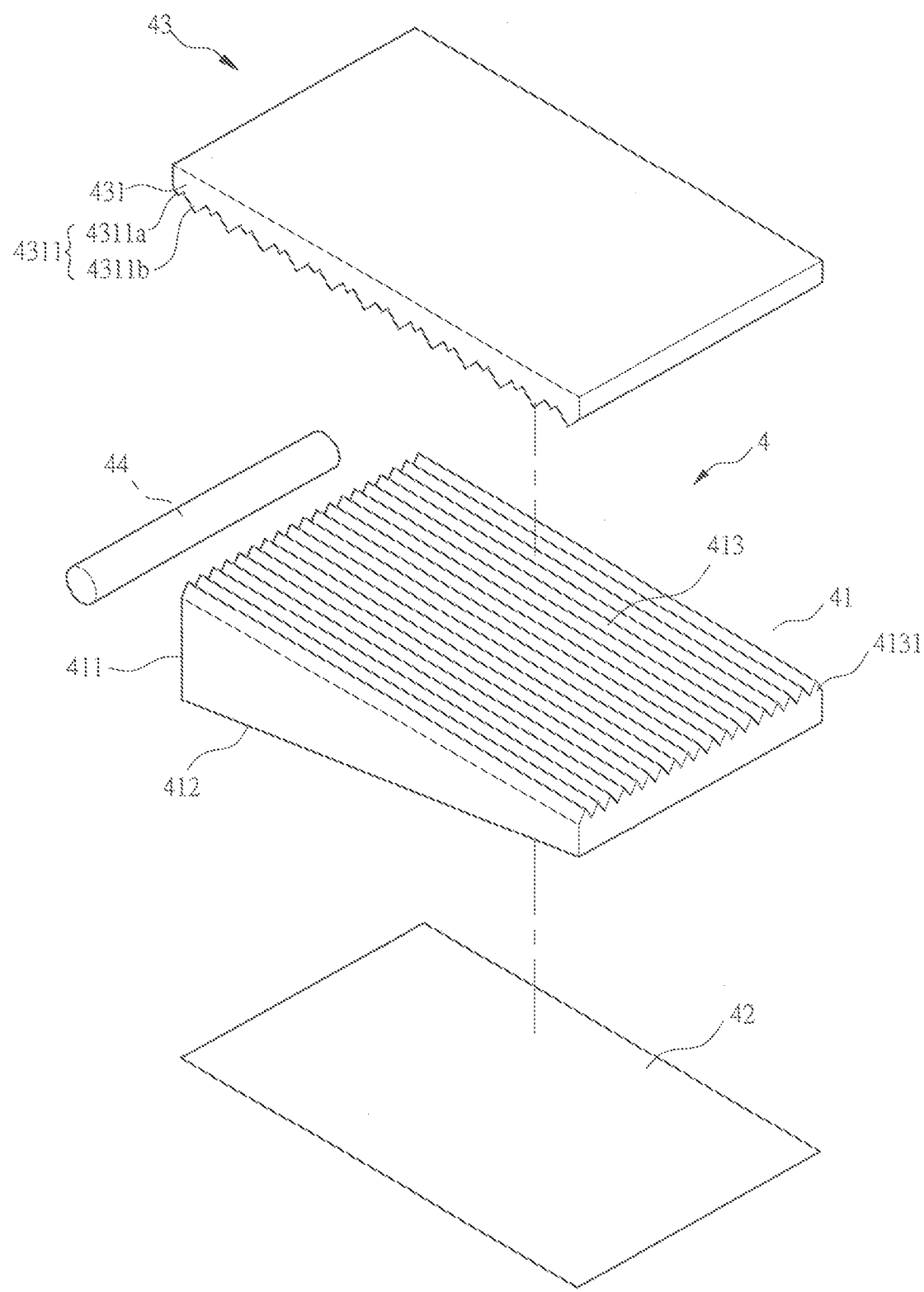
FIG. 1 shows an exploded view of a side-edge backlight module constructed in accordance with the present invention.

With reference to the drawings and in particular to FIG. 1, a backlight module constructed in accordance with the present invention, generally designated with reference numeral 4, comprises a light guide board 41 made of a material that has excellent light transmittance, such as polymethyl methacrylate (PMMA), at least a reflector film 42, an optic film 43, and a light source 44. The light guide board 41 has at least one light incidence surface 411 to receive light emitted from the light source 44 so that light received at the incidence surface 411 can transmit through interior of the light guide board 41; a reflection surface 412 serving to reflect light, the reflector film 42 being arranged outside the reflection surface 412 of the light guide board 41 to reflect and redirect light transmitting outside the reflection surface 412 back into the interior of the light guide board 41; a light emitting surface 413 serving to emit the light inside the light guide board 41 outward and forming a plurality of densely distributed prism-like light guides 4131 thereon to effect light convergence when the light exits.

Figure 2:
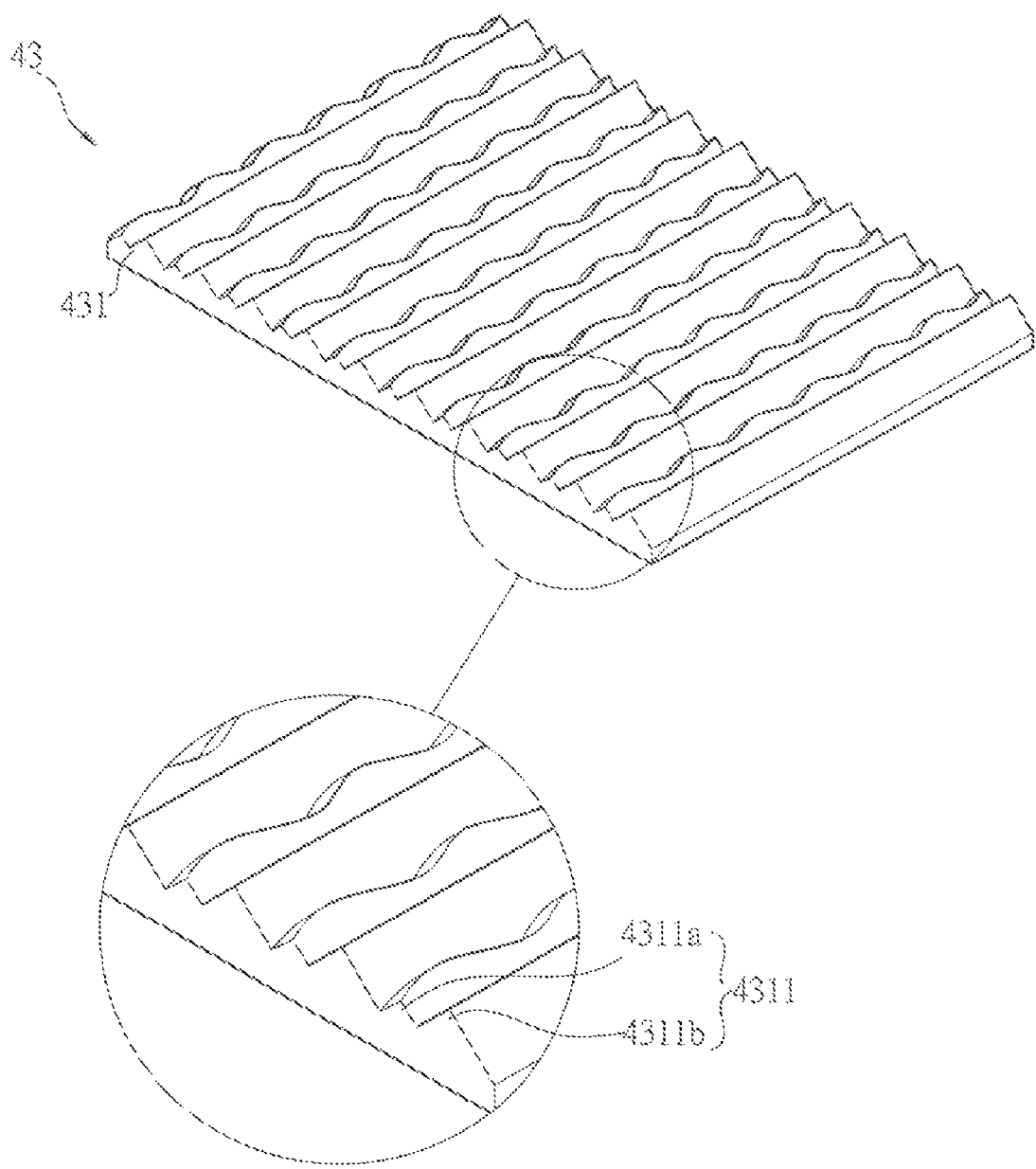
FIG. 2 shows a perspective view of an optic film constructed in accordance with a first embodiment of the present invention.
Figure 3:
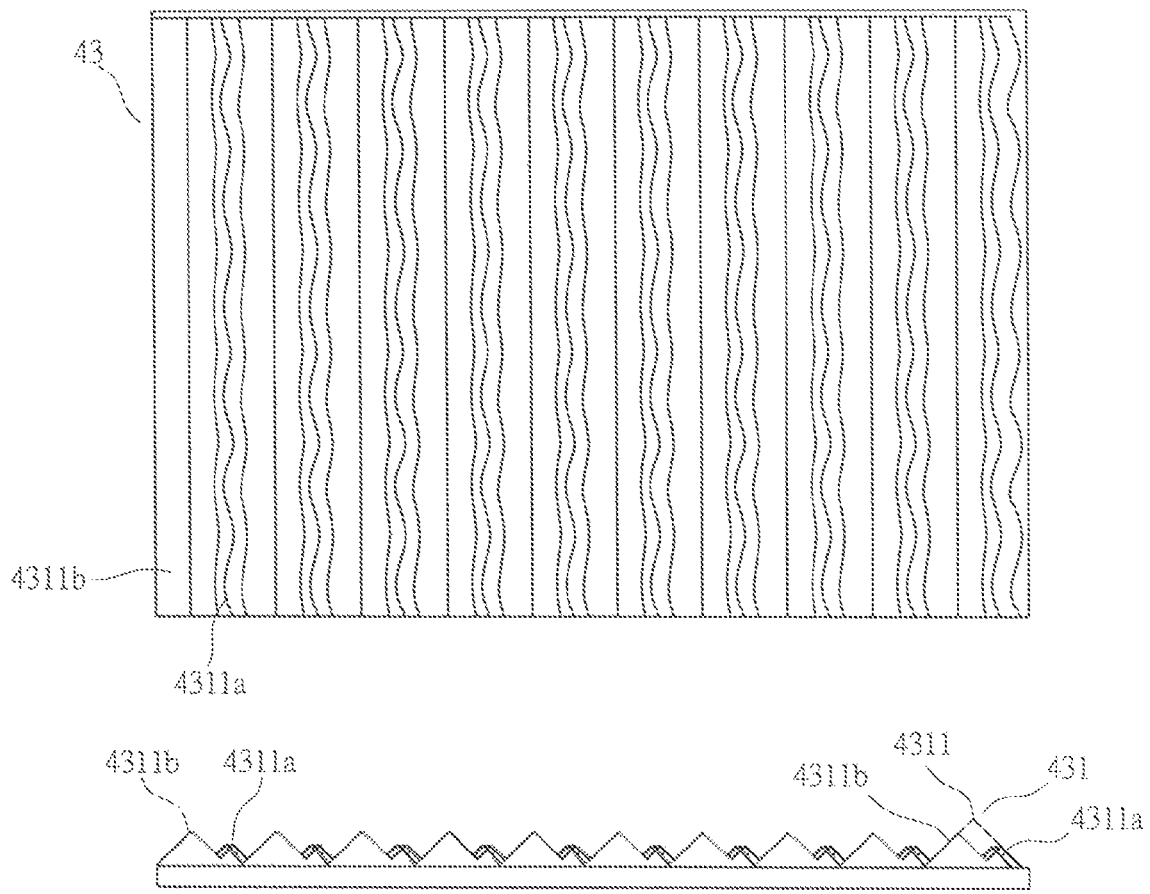
FIG. 3 shows a top plan view and an end view of the optic film of FIG. 2.
Figure 4:
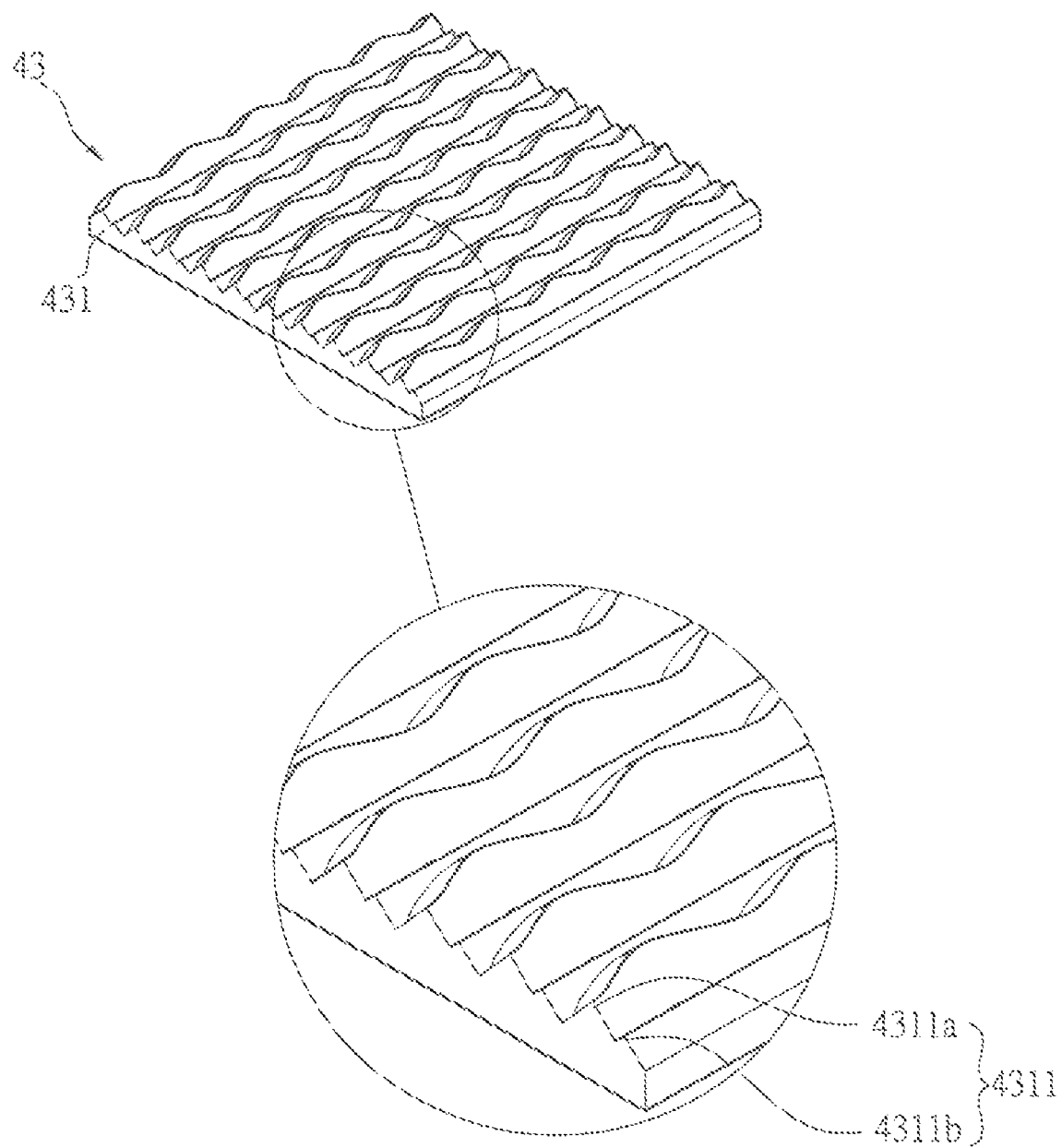
FIG. 4 shows a perspective view of an optic film constructed in accordance with a second embodiment of the present invention.
Figure 5:
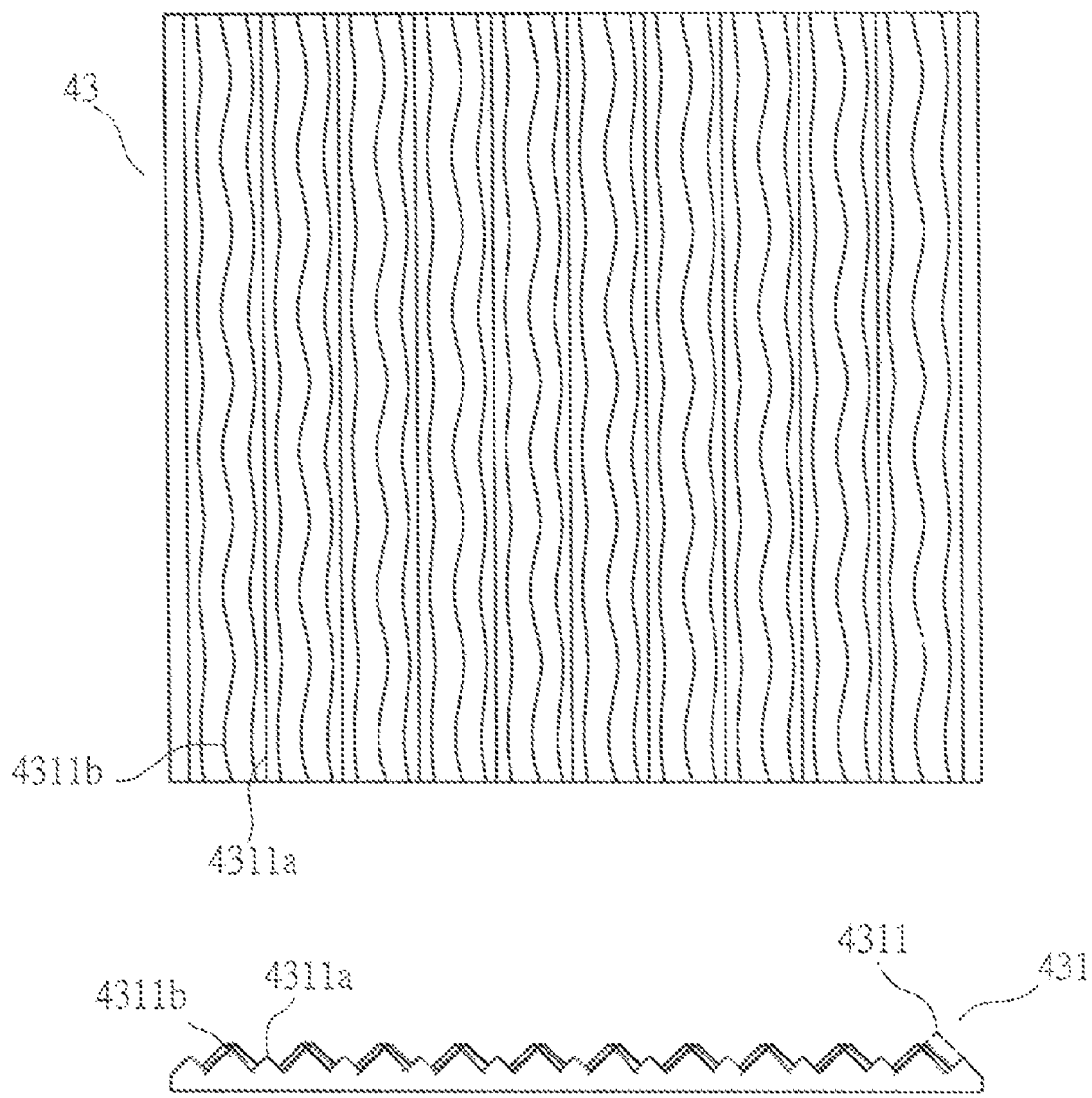
FIG. 5 shows a top plan view and an end view of the optic film of FIG. 4.
Figure 6:
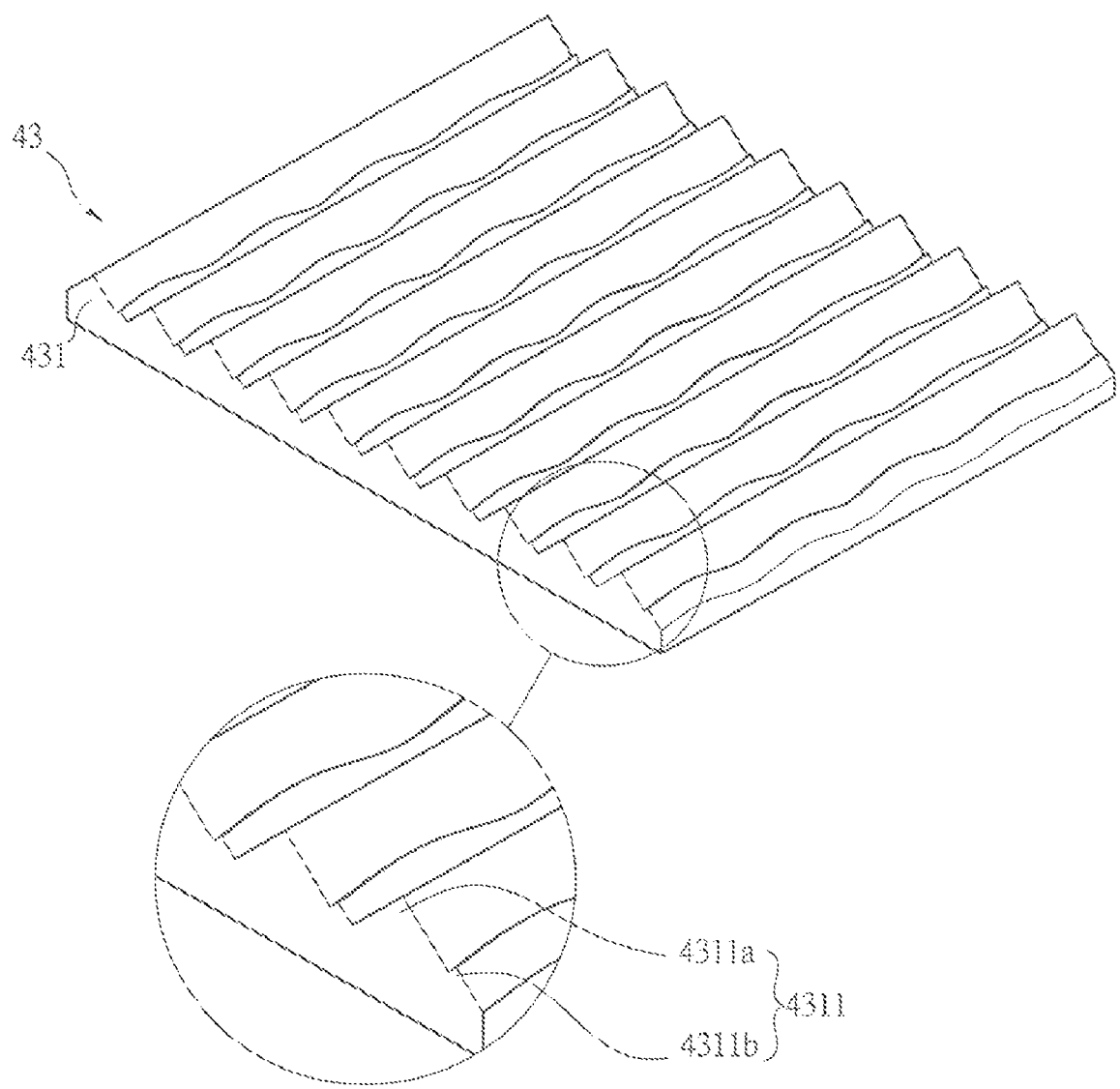
FIG. 6 shows a perspective view of an optic film constructed in accordance with a third embodiment of the present invention.
Figure 7:
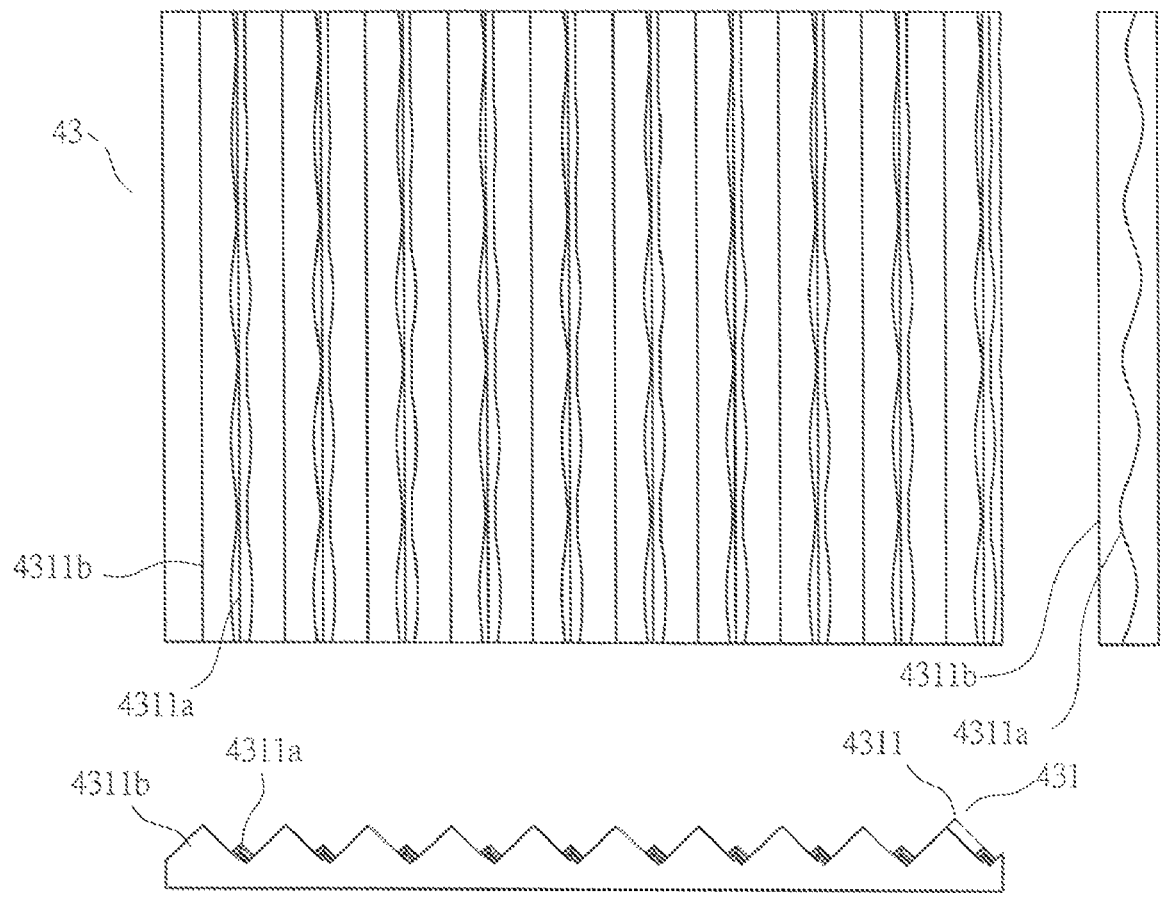
FIG. 7 shows a top plan view, an end view, and a side elevational view of the optic film of FIG. 6.
Figure 8:
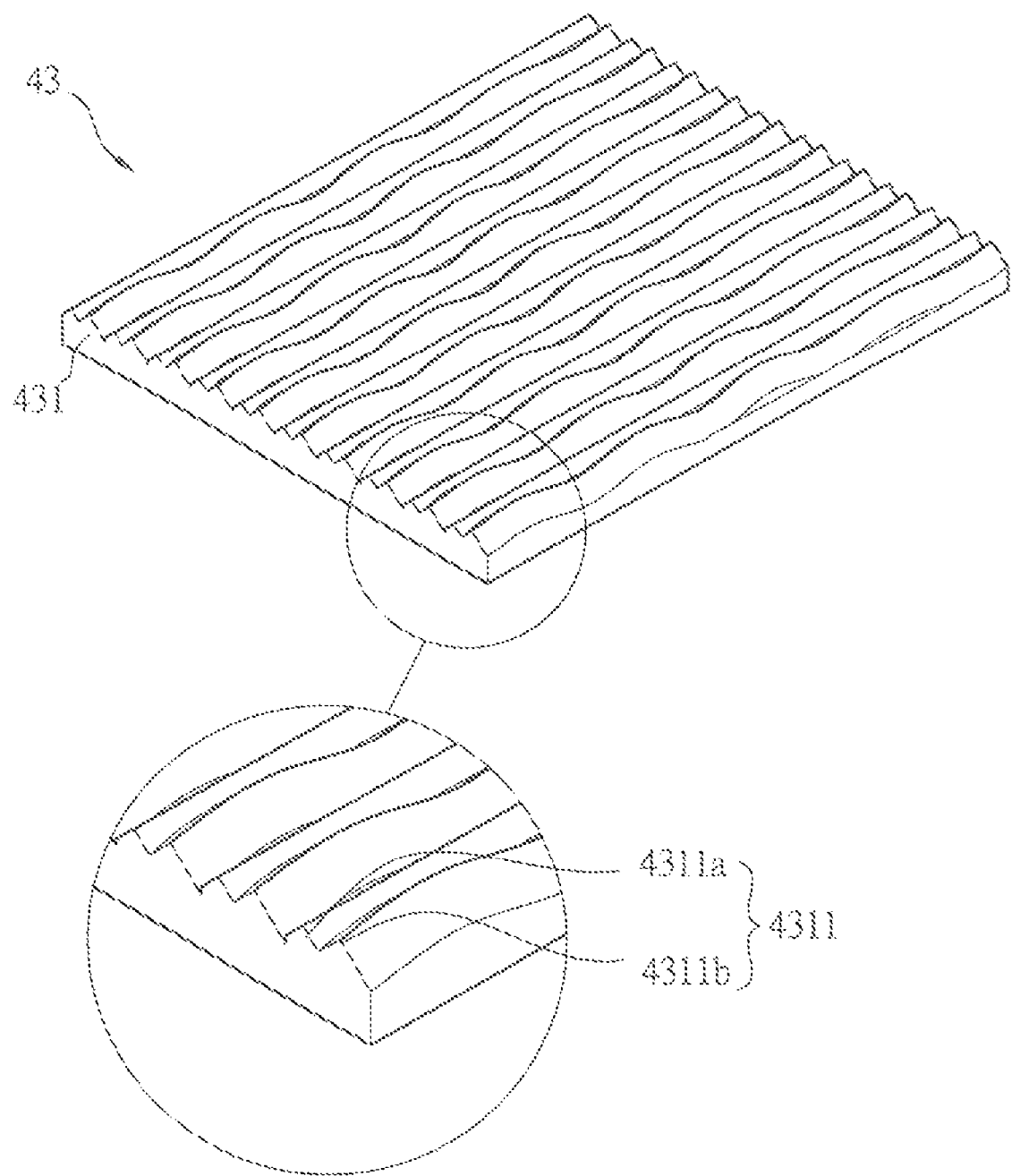
FIG. 8 shows a perspective view of an optic film constructed in accordance with a fourth embodiment of the present invention.
Figure 9:
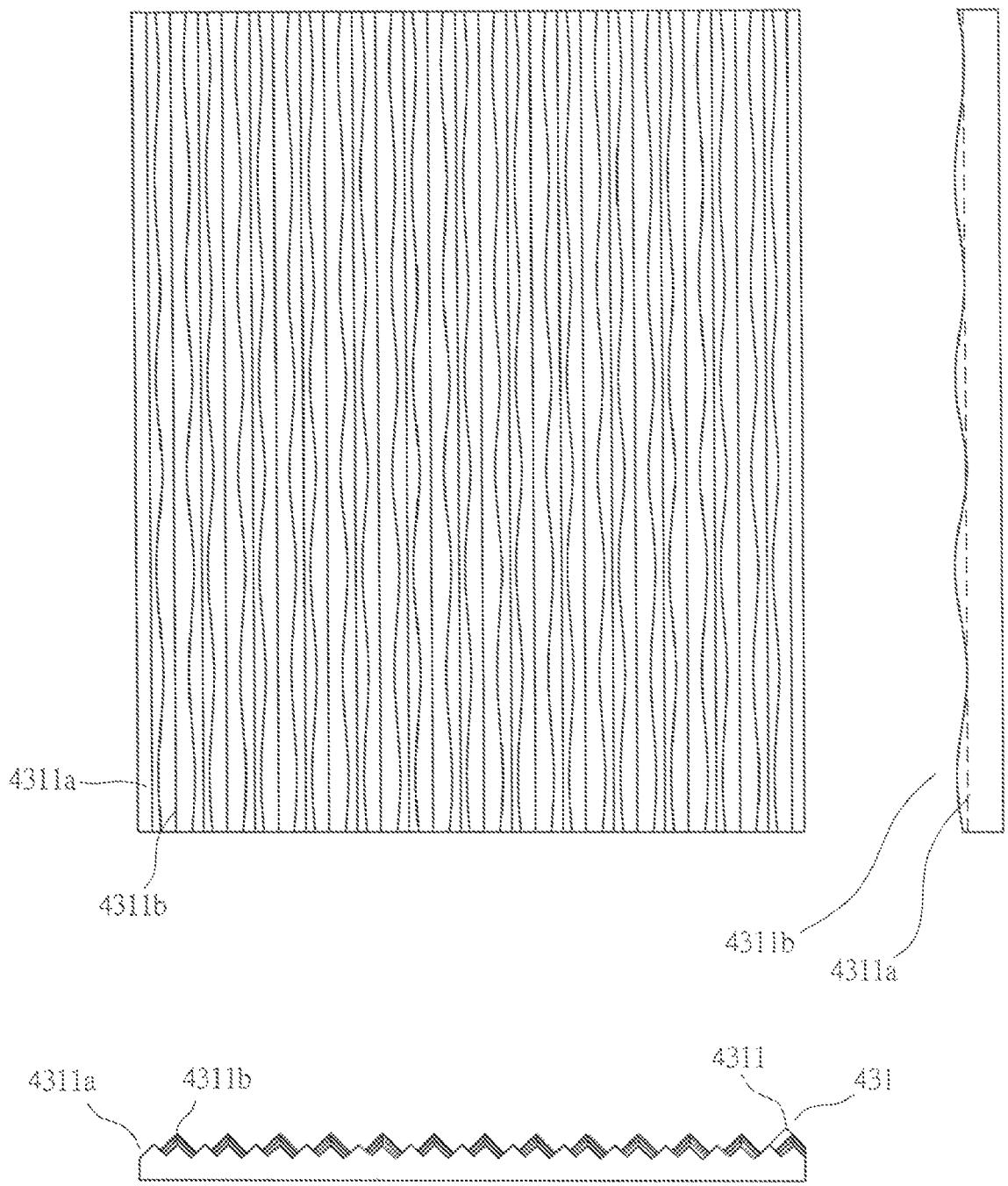
FIG. 9 shows a top plan view, an end view, and a side elevational view of the optic film of FIG. 8.
Figure 10:
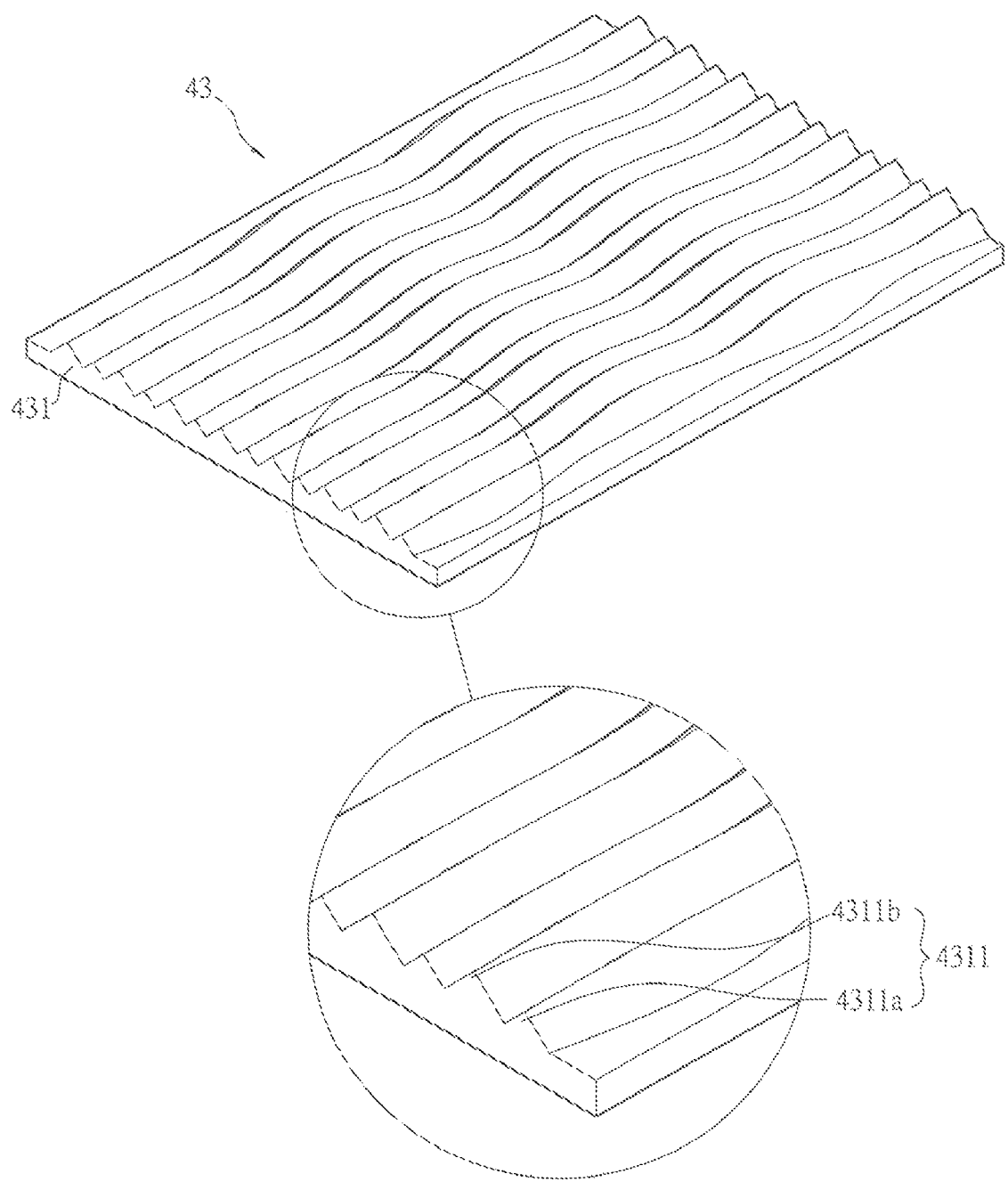
FIG. 10 shows a perspective view of an optic film constructed in accordance with a fifth embodiment of the present invention.
Figure 11:
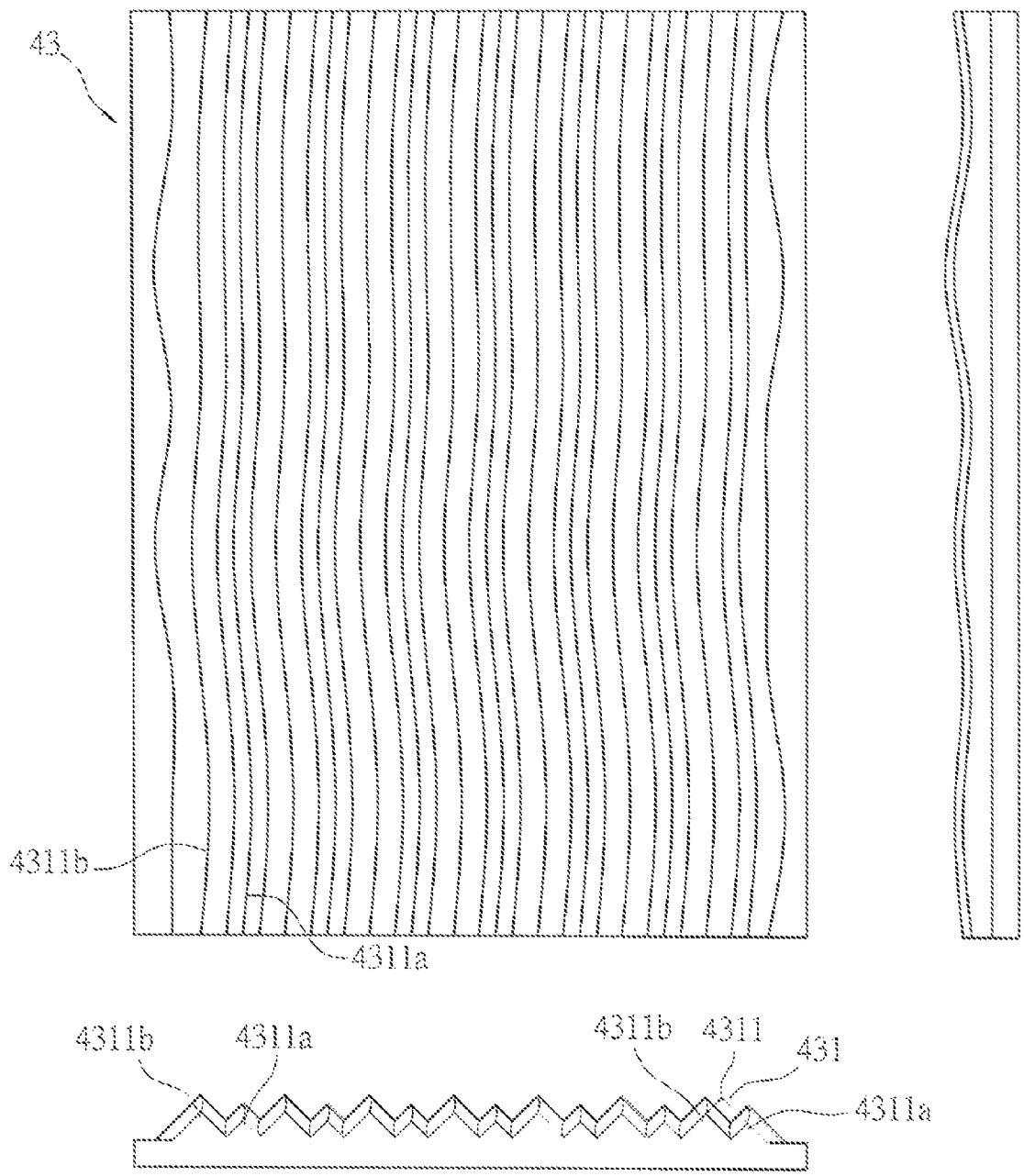
FIG. 11 shows a top plan view, an end view, and a side elevational view of the optic film of FIG. 10.
Figure 12:
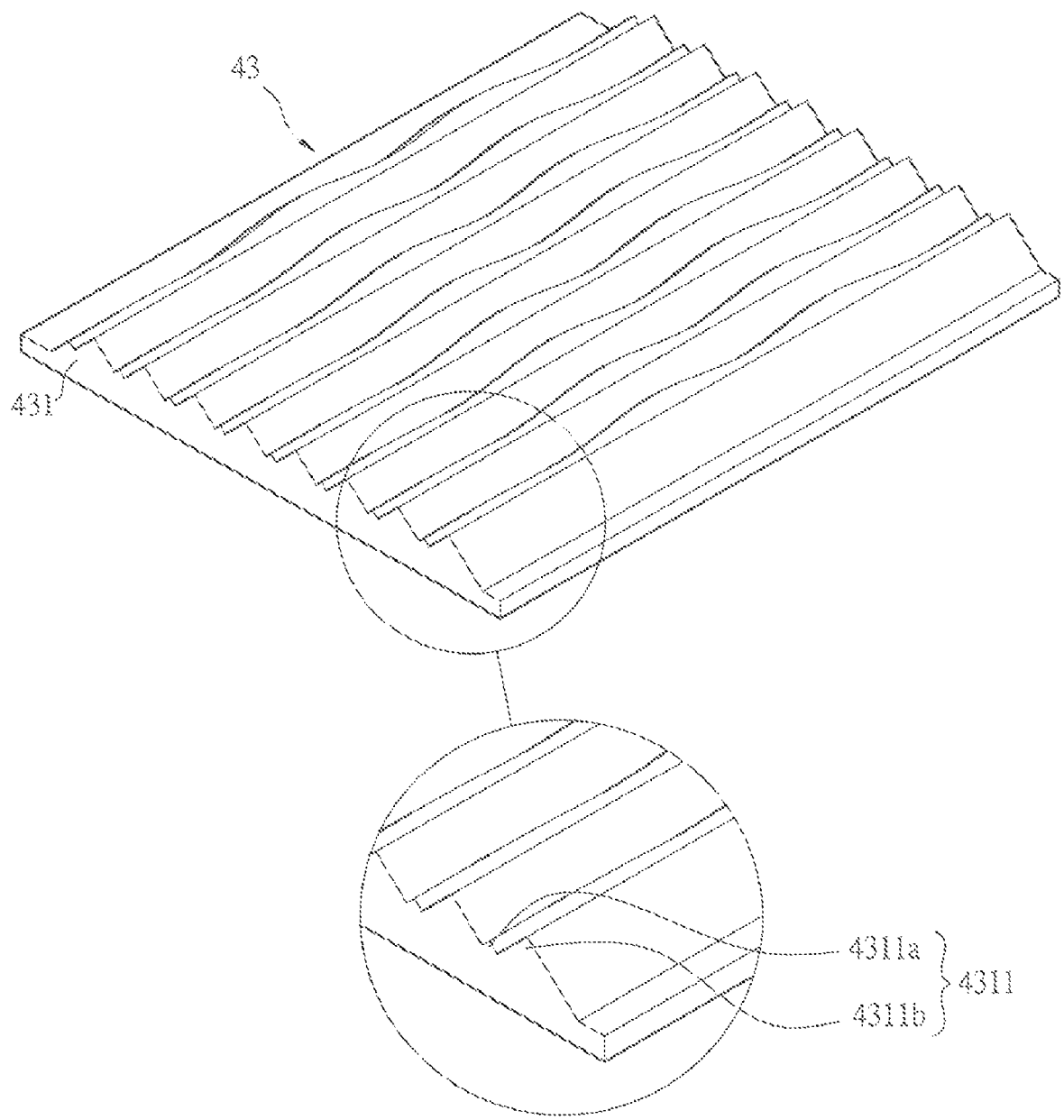
FIG. 12 shows a perspective view of an optic film constructed in accordance with a sixth embodiment of the present invention.
Figure 13:
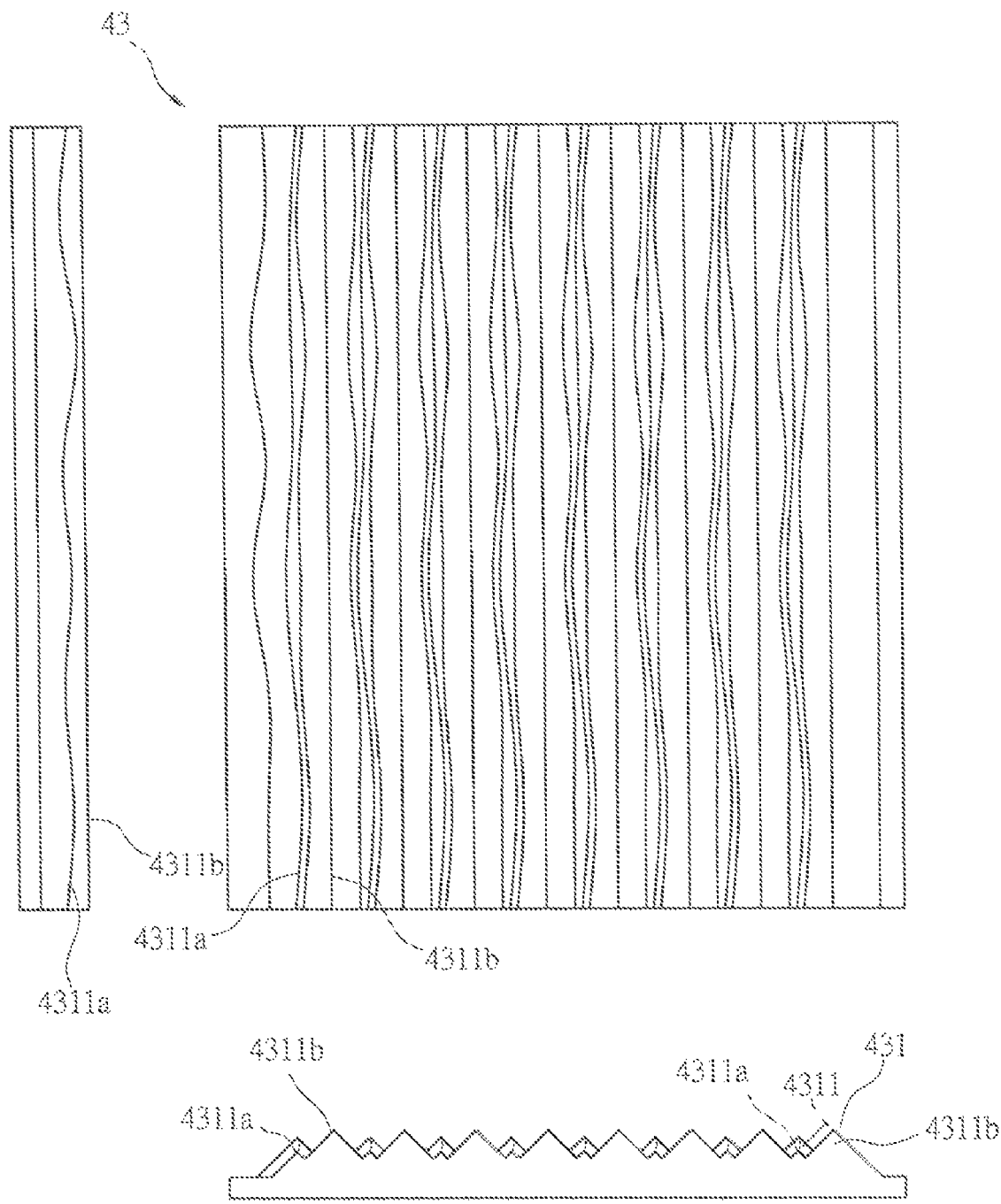
FIG. 13 shows a top plan view, an end view, and a side elevational view of the optic film of FIG. 12.

Also referring to FIG. 2, the optic film 43 is made of material that has excellent light transmittance. The optic film 43 has a surface on which a plurality of rib-like micro light guides 431 is formed. The rib-like micro light guides 431 can be made of the same material as a body of the optic film 43, or alternatively, the rib-like micro light guides 431 are made of materials different from that making the body of the optic film 43. Each micro light guide 431 comprises at least two ridges 4311, of which the number is taken as two for illustration of the present embodiment. The ridges 4311 of the micro light guide 431 are of different heights and thus include a low ridge 4311a and a high ridge 4311b. The optic film 43 is arranged outside the light emitting surface 413 of the light guide board 41 with the surface of the optic film 43 that forms the micro light guides 431 opposing the light emitting surface 413 of the light guide board 41 and the rib-like micro light guides 431 of the optic film 43 orientated in a direction that is not parallel to the direction in which the prism-like light guides 4131 of the light guide board 41 extend.

Referring to FIG. 2, to embody the optic film 43 in accordance with the present invention, the ridges 4311 of the micro light guide 43 are of different heights, and are thus divided into the low ridge 4311a and the high ridge 4311b. As shown in FIGS. 2-5, either the low ridge 4311a or the high ridge 4311b of the micro light guide 431 or both are of a continuous left-and-right wavy configuration. As such, when light transmits through the optic film 43, the continuous left-and-right wavy configuration of the low ridge 4311a (or the high ridge 4311b) causes the light that transmits through and that is converged by the micro light guide 431 to leave the micro light guide 431 in a non-straight linear beam, and contains variations caused by curving. Thus, the light beam passing through the optic film 43 is not in a regular form, which prevents the light from inducing refraction when the light passes through thin-film transistors and color filters of a liquid crystal display panel whereby no interference pattern will occur in image displaying by the liquid crystal display panel.

Referring to FIGS. 6-9, in accordance with another embodiment of the present invention, the low ridge 4311a or the high ridge 4311b of the micro light guide 431 or both are made a continuous up-and-down height-variation configuration. As such, when light transmits through the optic film 43, the continuous up-and-down wavy configuration of the low ridge 4311a or the high ridge 4311b of the micro light guide 431 can similarly make the light beam that is converged by the light guide 43 irregular so that the light induces no interference pattern in a liquid crystal display panel when the light passes through thin-film transistors and color filters of the liquid crystal display panel.

Figure 14:
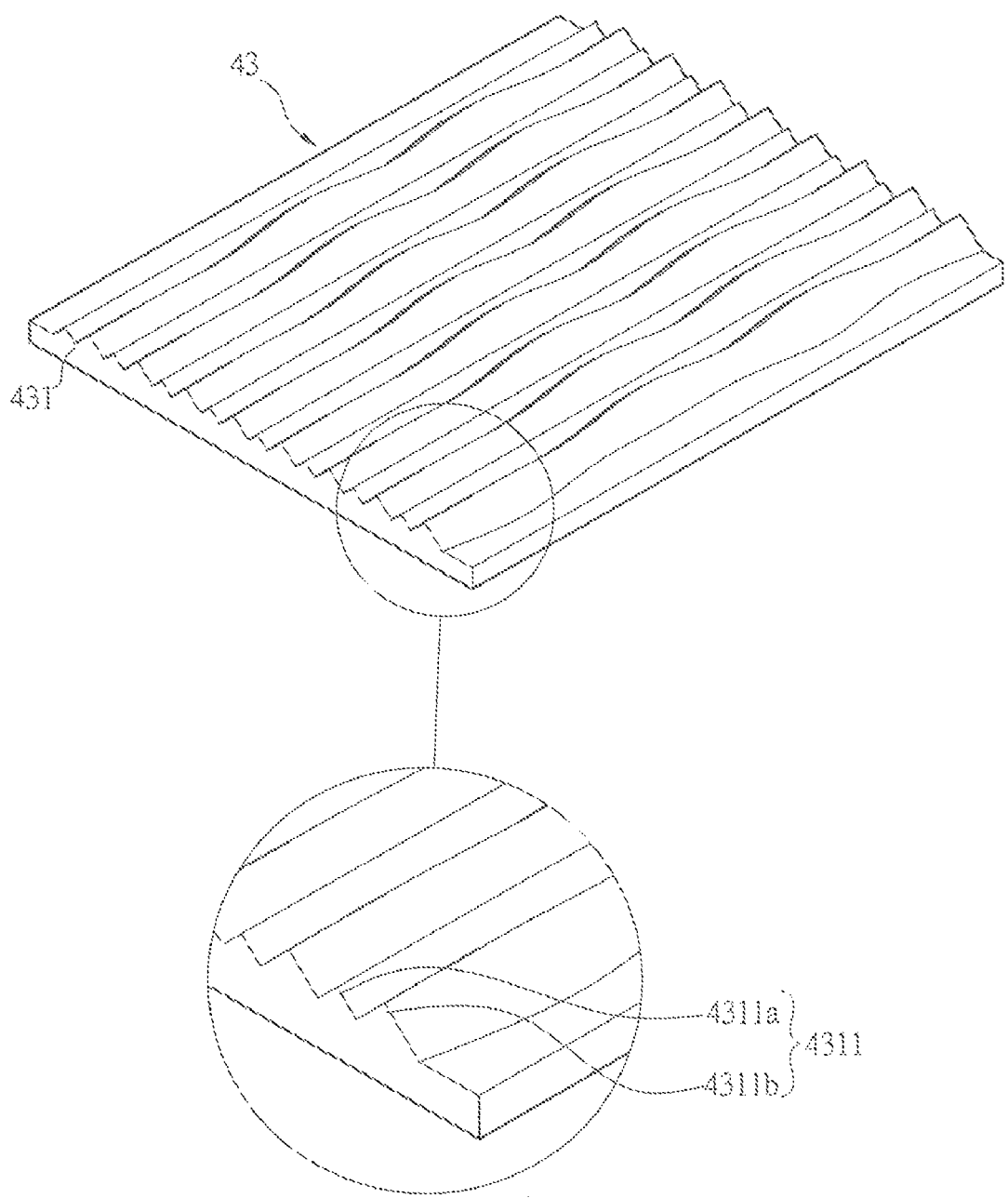
FIG. 14 shows a perspective view of an optic film constructed in accordance with a seventh embodiment of the present invention.
Figure 15:
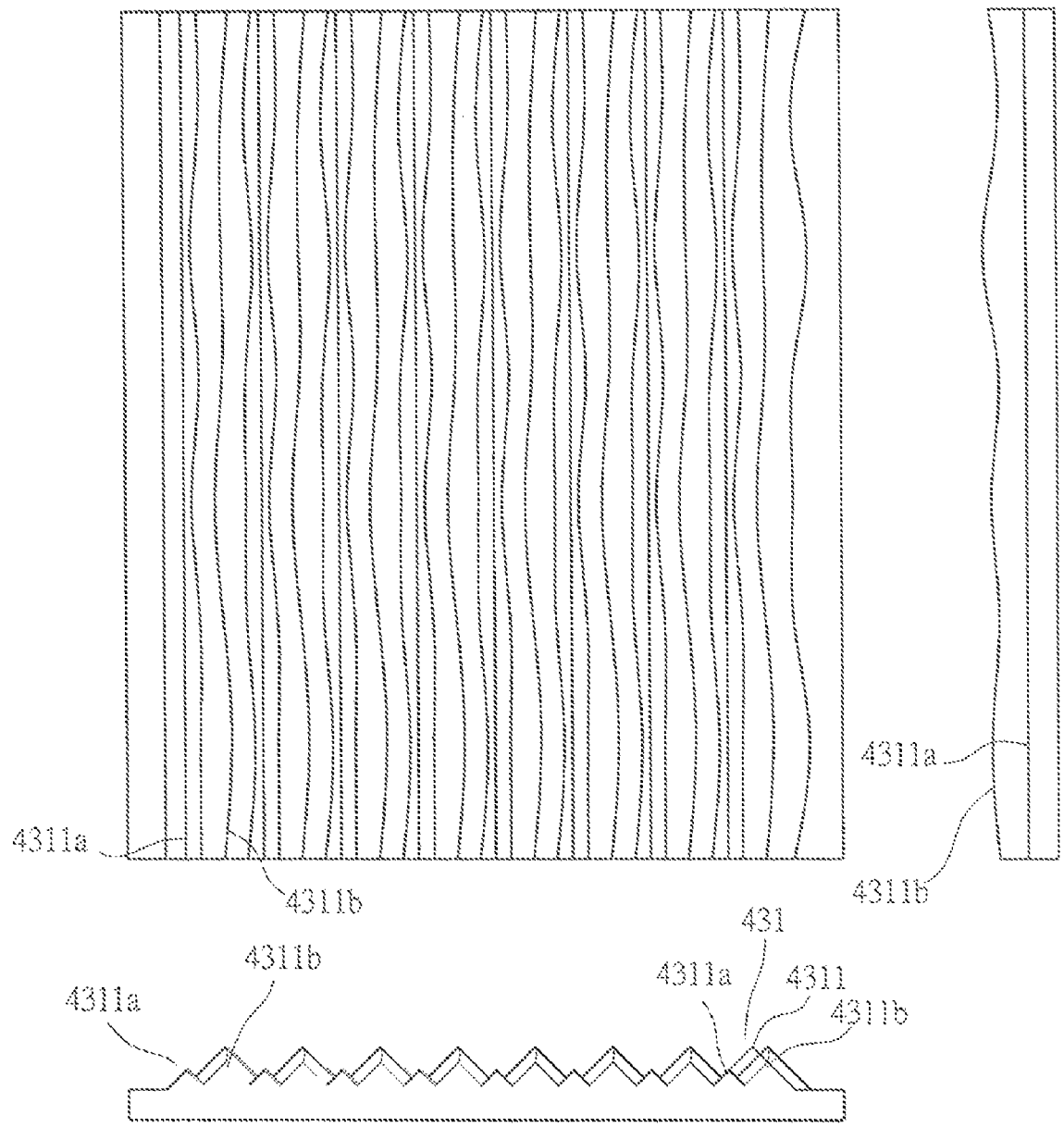
FIG. 15 shows a top plan view, an end view, and a side elevational view of the optic film of FIG. 14.

Referring to FIGS. 10-13, in accordance with a further embodiment of the present invention, the low ridge 4311a or the high ridge 4311b of the micro light guide 431 is made both a left-and-right wavy configuration and a continuous up-and-down height-variation configuration, or alternatively as shown in FIGS. 14 and 15, both he low ridge 4311a and the high ridge 4311b of the micro light guide 431 are made both a left-and-right wavy configuration and a continuous up-and-down height-variation configuration. As such, when light transmits through the optic film 43, the continuous up-and-down height-variation and left-and-right wavy configuration of the low ridge 4311a or the high ridge 4311b of the micro light guide 43 makes the light beam that is converged by the light guide 43 irregular so that the light induces no interference pattern in a liquid crystal display panel when the light passes through thin-film transistors and color filters of the liquid crystal display panel.

Figure 16:
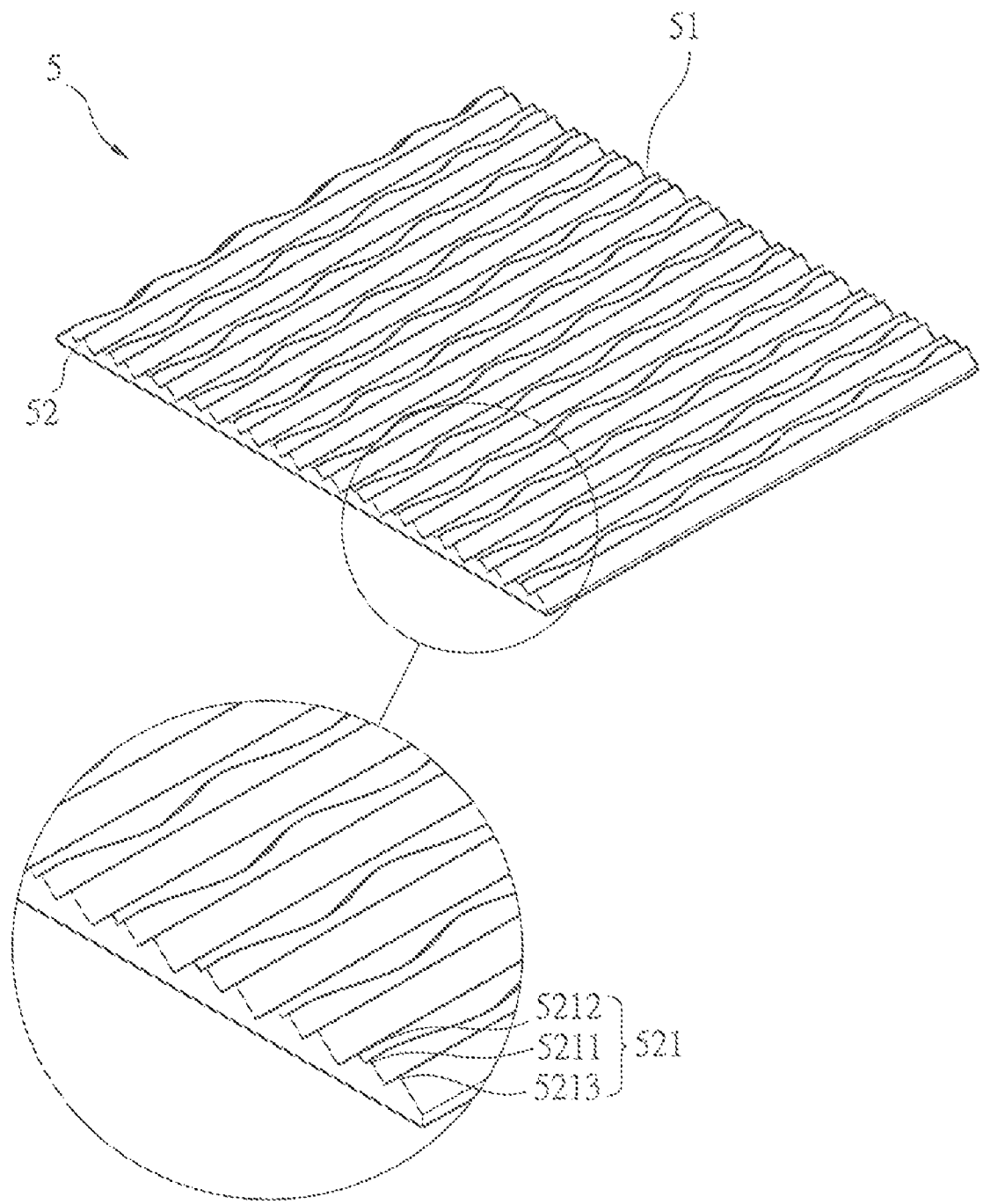
FIG. 16 shows a perspective view of an optic film constructed in accordance with an eighth embodiment of the present invention.
Figure 17:
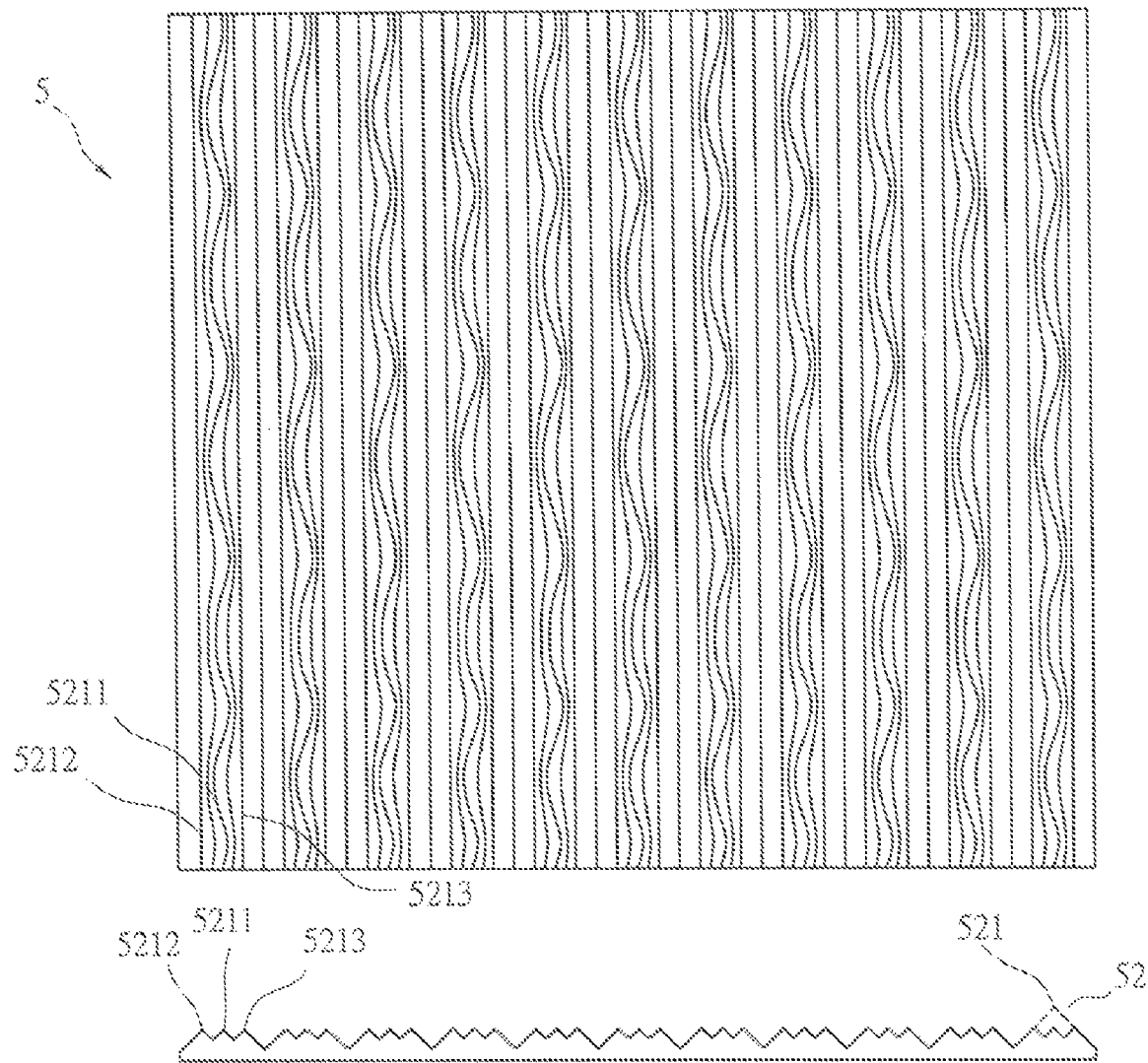
FIG. 17 shows a top plan view and an end view of the optic film of FIG. 16.

Referring to FIGS. 16 and 17, in accordance with a further embodiment of the present invention, an optic film 5 has a surface 51 on which a plurality of rib-like micro light guides 52 is formed. Each micro light guide 52 comprises at least two ridges 521, of which the number is taken as three for illustration of the present embodiment. All the ridges 521 of the micro light guides 52 are of substantially identical height and all or some of the ridges 521 of the micro light guides 52 have a variable configuration, wherein for example, a central ridge 5211 of the micro light guides 52 has a left-and-right wavy configuration, while two side ridges 5212, 5213 are of straight linear configuration. As such, when light transmits through the optic film 5, the continuous left-and-right wavy configuration of the central ridge 5211 of the micro light guide 52 makes the light beam that is converged by the micro light guide 52 irregular so that the light induces no interference pattern in a liquid crystal display panel when the light passes through thin-film transistors and color filters of the liquid crystal display panel.

Figure 18:
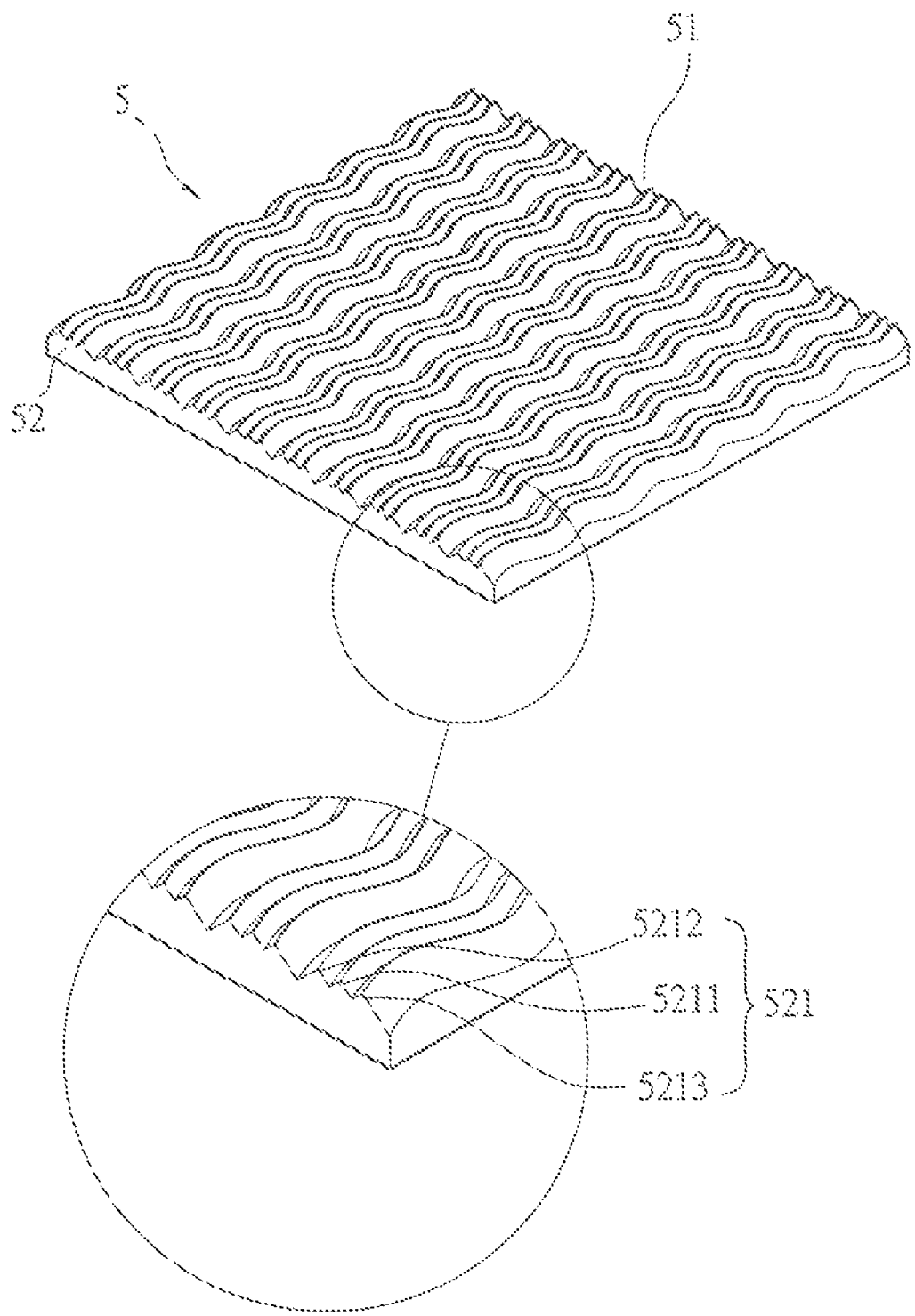
FIG. 18 shows a perspective view of an optic film constructed in accordance with a ninth embodiment of the present invention.
Figure 19:
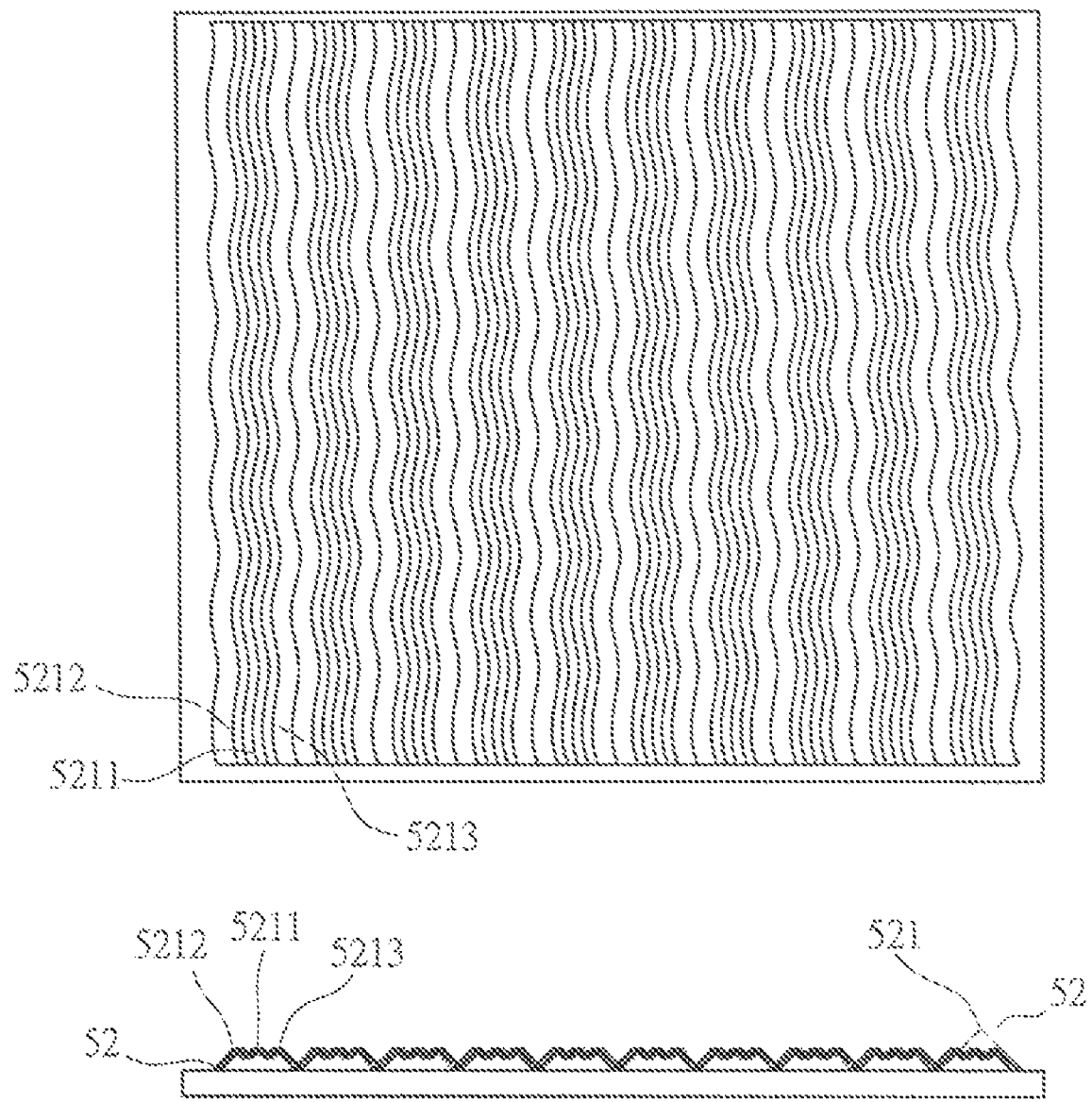
FIG. 19 shows a top plan view and an end view of the optic film of FIG. 18.

Referring to FIGS. 18 and 19, in accordance with a further embodiment of the present invention, all the ridges 5211, 5212, 5213 of each micro light guide 52 of the optic film 5 are made a continuous left-and-right wavy configuration. As such, light transmitting through the optic film 5 can be of variations, so that the light induces no interference pattern in a liquid crystal display panel when the light passes through thin-film transistors and color filters of the liquid crystal display panel.

Figure 20:
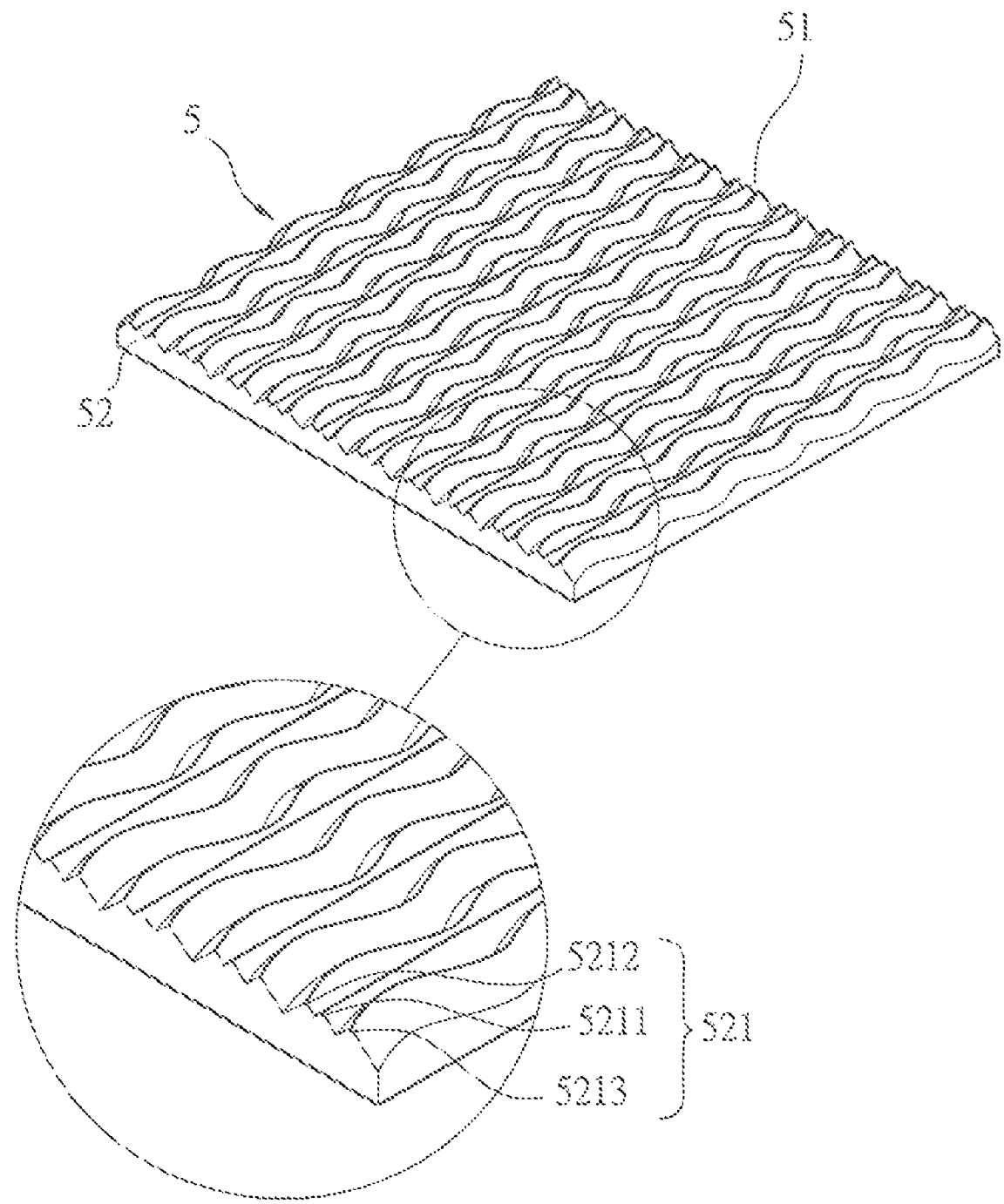
FIG. 20 shows a perspective view of an optic film constructed in accordance with a tenth embodiment of the present invention.
Figure 21:
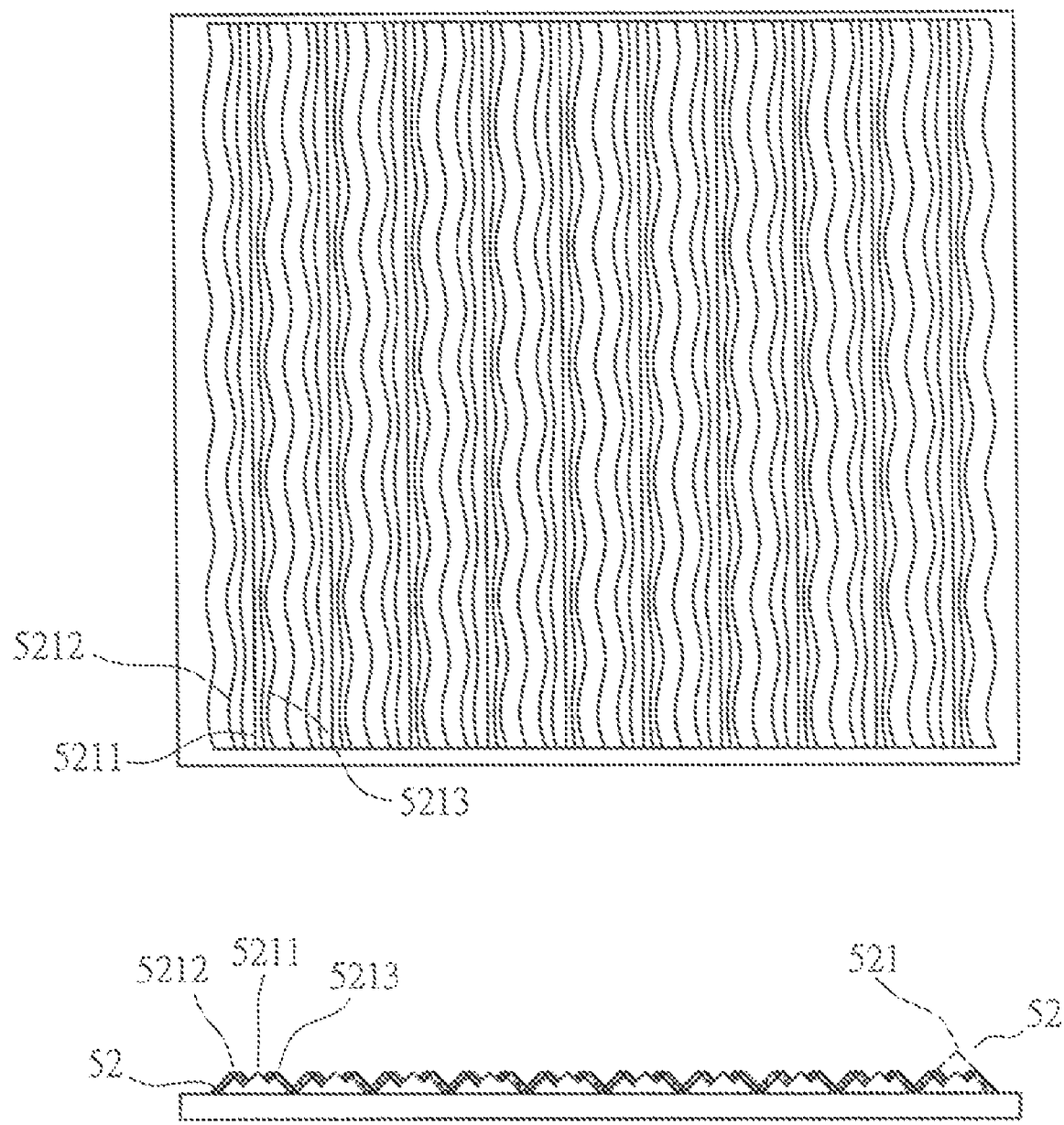
FIG. 21 shows a top plan view and an end view of the optic film of FIG. 20.

Referring to FIGS. 20 and 21, to embody the optic film 5 in accordance with a further embodiment of the present invention, two side ridges 5212, 5213 of the micro light guide 52, which are located on opposite sides of a central ridge 5211, are made a continuous left-and-right wavy configuration, while the central ridge 5211 is made a straight linear configuration. As such, light transmitting through the micro light guide 52 can be of variations, so that the light induces no interference pattern in a liquid crystal display panel when the light passes through thin-film transistors and color filters of the liquid crystal display panel.

Figure 22:
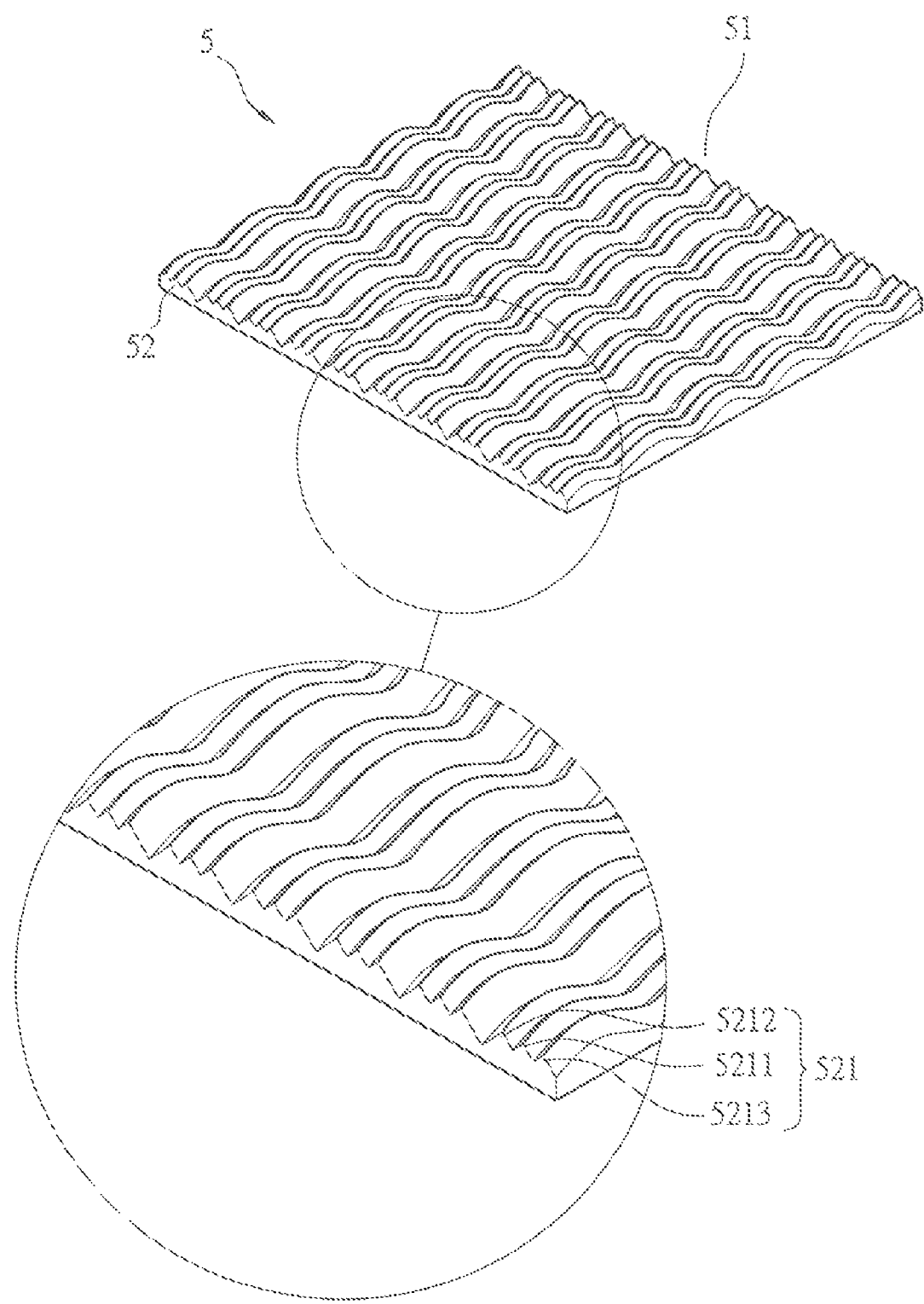
FIG. 22 shows a perspective view of an optic film constructed in accordance with an eleventh embodiment of the present invention.
Figure 23:
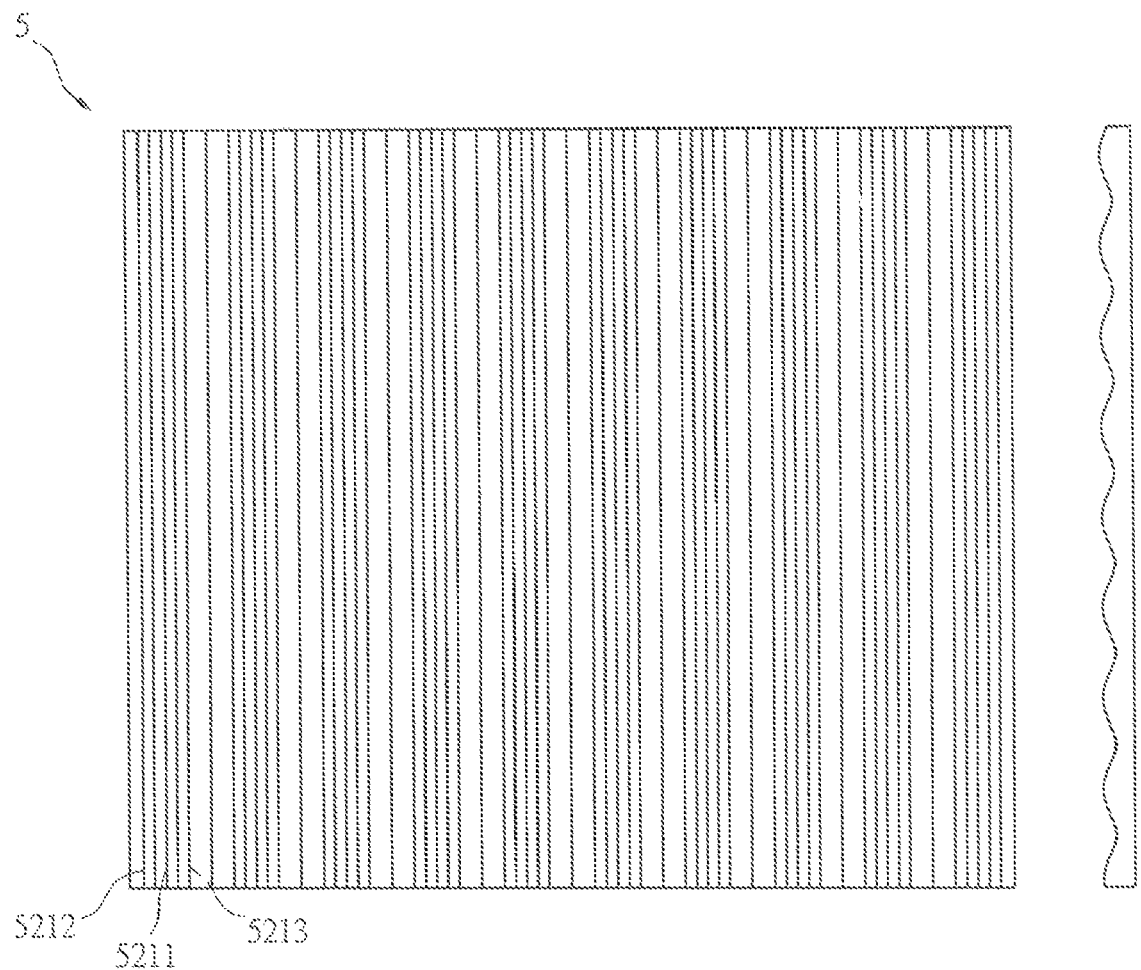
FIG. 23 shows a top plan view and a side elevational view of the optic film of FIG. 22.

Referring to FIGS. 22 and 23, to embody the optic film 5 in accordance with a further embodiment of the present invention, the ridge 5211, 5212, 5213 of each micro light guide 52 are all made a continuous up-and-down height-variation configuration. As such, light transmitting through the optic film 5 can be of variations caused by the continuous up-and-down variation of heights of the ridges 5211, 5212, 5213 of the micro light guide 52, so that the light induces no interference pattern in a liquid crystal display panel when the light passes through thin-film transistors and color filters of the liquid crystal display panel.

Figure 24:
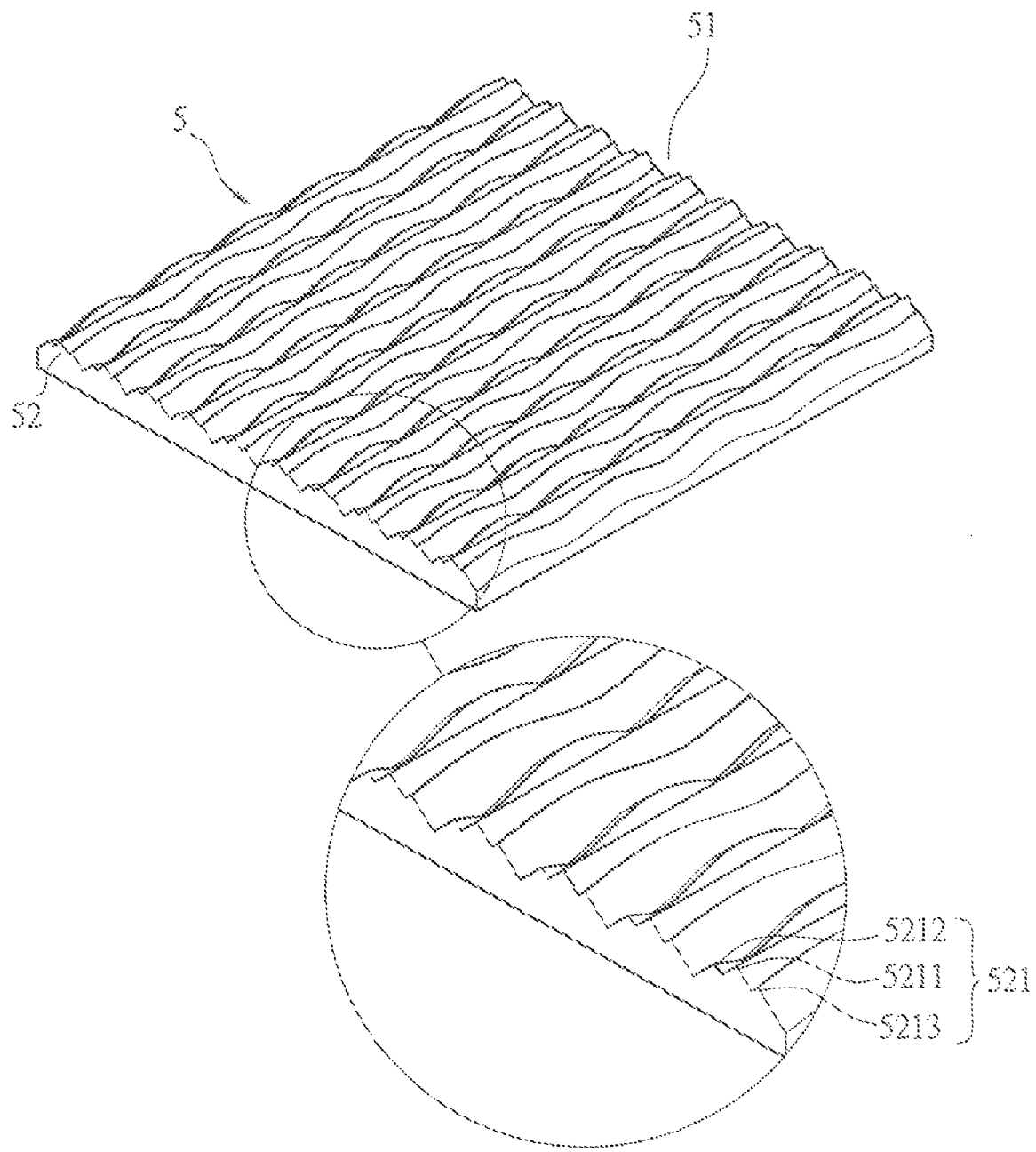
FIG. 24 shows a perspective view of an optic film constructed in accordance with a twelfth embodiment of the present invention.
Figure 25:
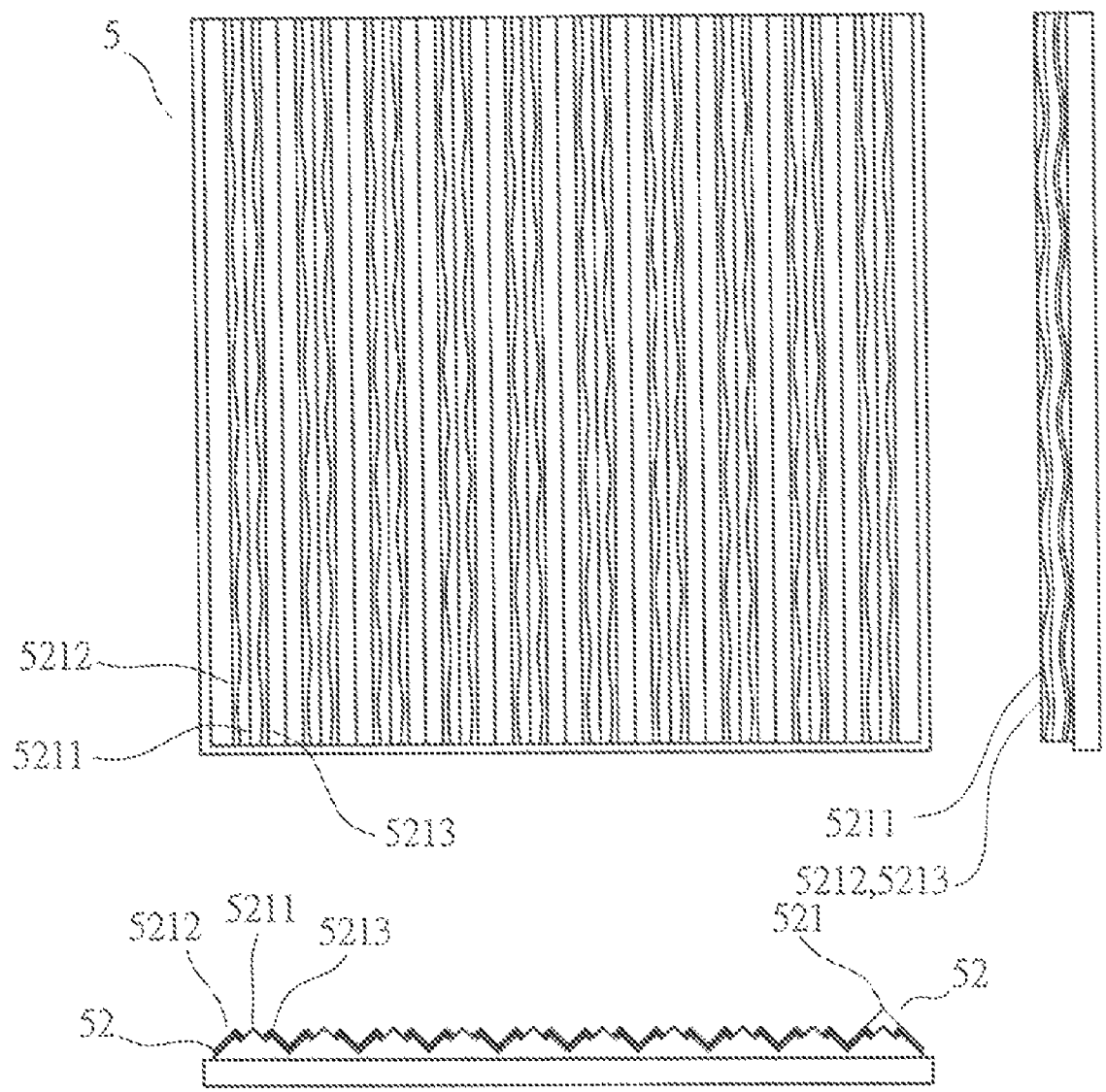
FIG. 25 shows a top plan view, an end view, and a side elevational view of the optic film of FIG. 24.

Referring to FIGS. 24 and 25, to embody the optic film 5 in accordance with a further embodiment of the present invention, two side ridges 5212, 5213 of the micro light guide 52, which are located on opposite sides of a central ridge 5211, are made a continuous up-and-down height-variation configuration, while the central ridge 5211 is of a a fixed height. As such, light transmitting through the optic film 5 can be of variations caused by the continuous up-and-down variation of heights of the side ridges 5212, 5213 of the micro light guide 52, so that the light induces no interference pattern in a liquid crystal display panel when the light passes through thin-film transistors and color filters of the liquid crystal display panel.

Figure 26:
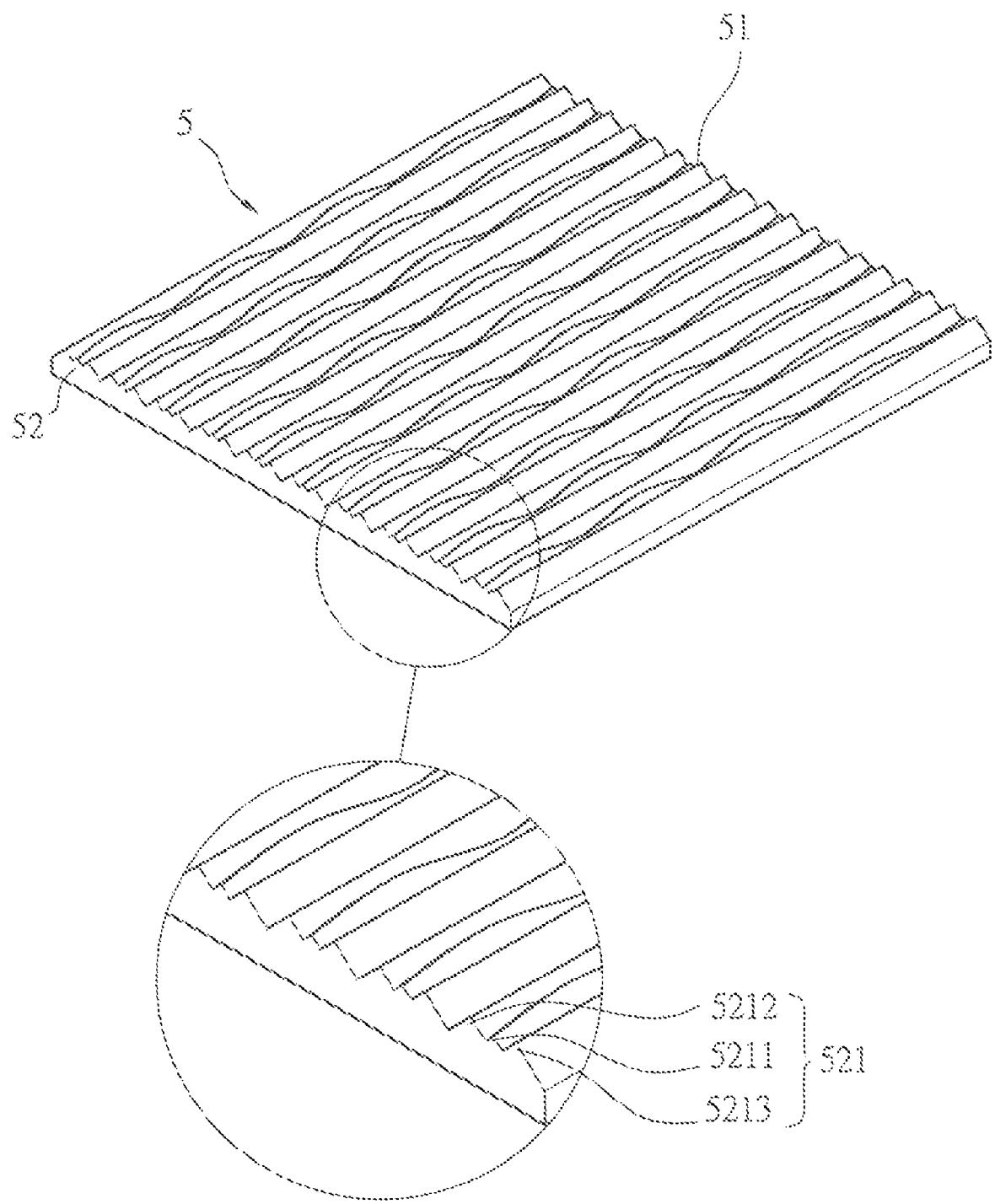
FIG. 26 shows a perspective view of an optic film constructed in accordance with a thirteenth embodiment of the present invention.
Figure 27:
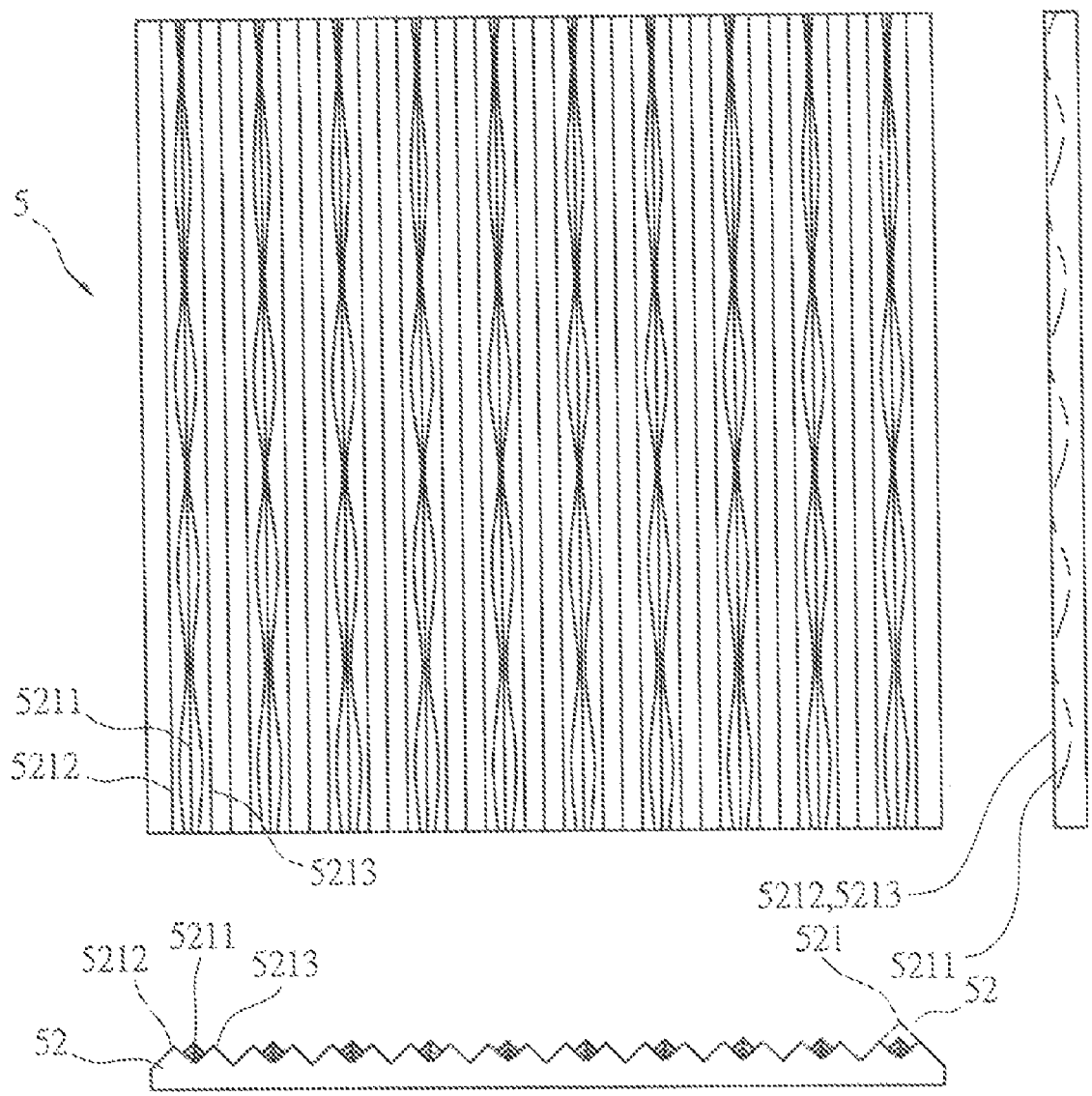
FIG. 27 shows a top plan view, an end view, and a side elevational view of the optic film of FIG. 25.

Referring to FIGS. 26 and 27, to embody the optic film 5 in accordance with a further embodiment of the present invention, a central ridge 5211 of the micro light guide 52 is made a continuous up-and-down height-variation configuration, while side ridges 5212, 5213, which are located on opposite sides of the central ridge 3211, are of fixed heights. As such, light transmitting through the optic film 5 can be of variations caused by the continuous up-and-down variation of height of the central ridges 5211 of the micro light guide 52, so that the light induces no interference pattern in a liquid crystal display panel when the light passes through thin-film transistors and color filters of the liquid crystal display panel.

Figure 28:
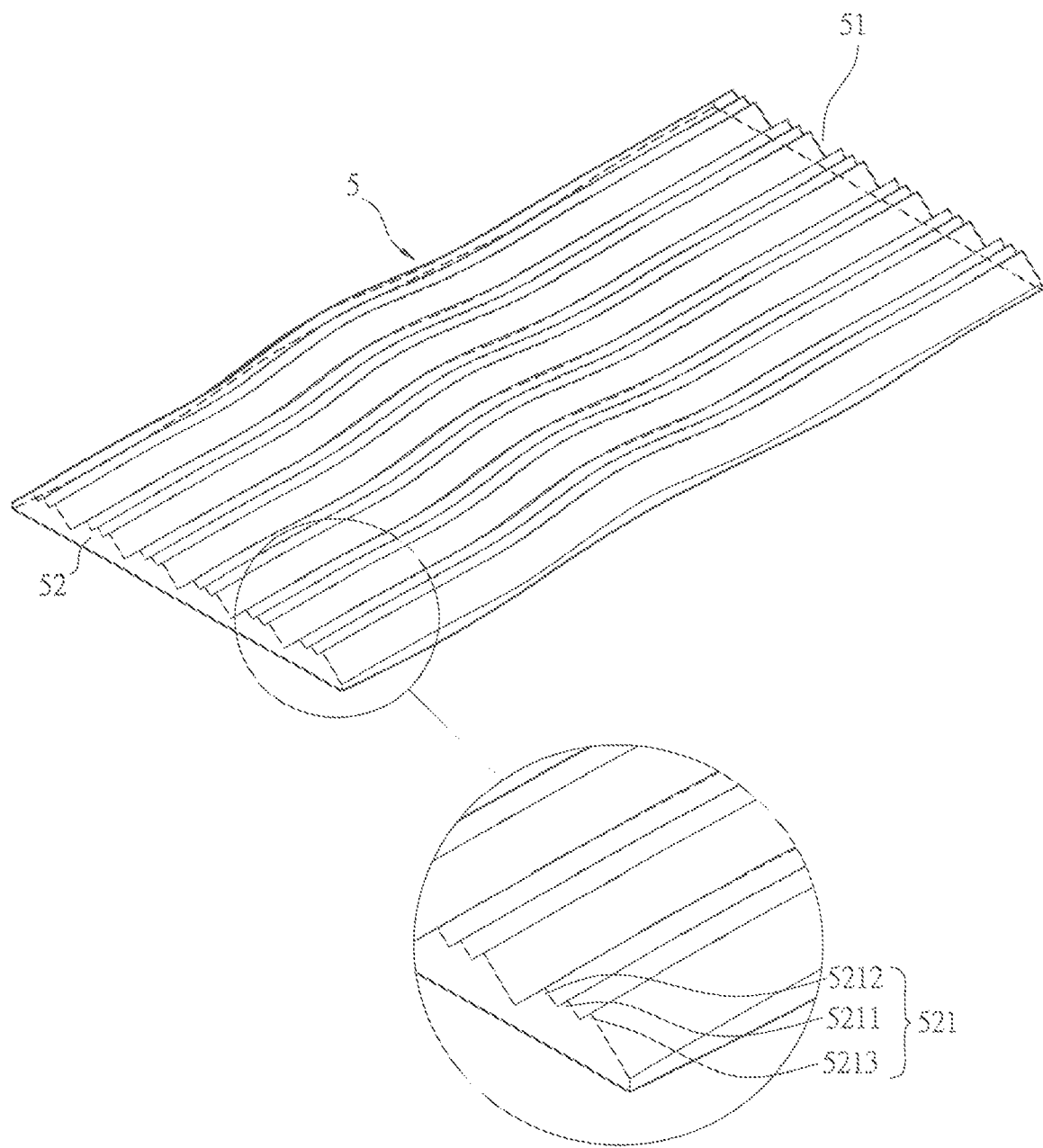
FIG. 28 shows a perspective view of an optic film constructed in accordance with a fourteenth embodiment of the present invention.
Figure 29:
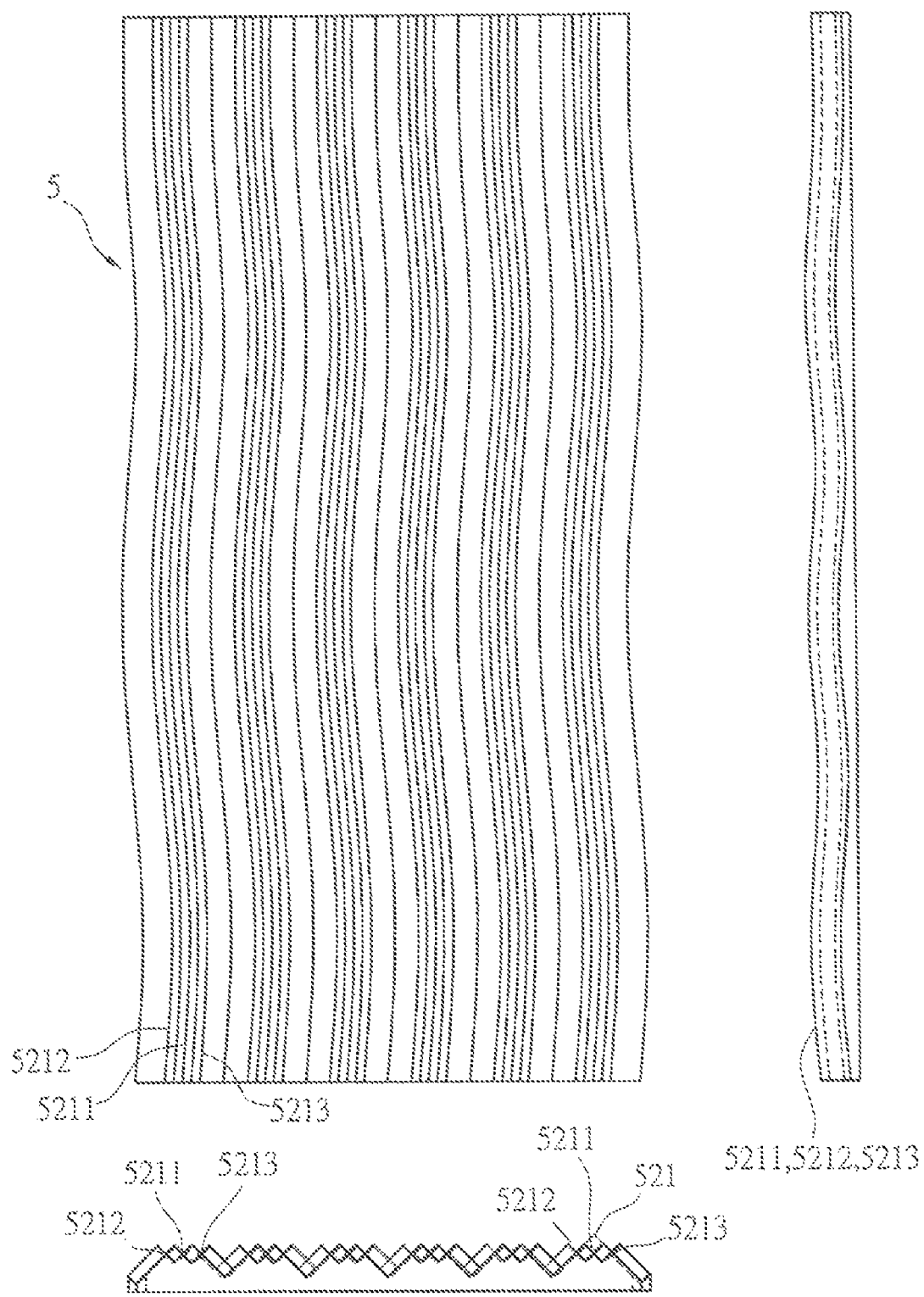
FIG. 29 shows a top plan view, an end view, and a side elevational view of the optic film of FIG. 28.

Referring to FIGS. 28 and 29, to embody the optic film 5 in accordance with a further embodiment of the present invention, the ridges 5211, 5212, 5213 of each micro light guide 52 are all made both a continuous left-and-right wavy configuration and a continuous up-and-down height-variation configuration. As such, light transmitting through the micro light guide 52 can be of variations, so that the light induces no interference pattern in a liquid crystal display panel when the light passes through thin-film transistors and color filters of the liquid crystal display panel.

Figure 30:
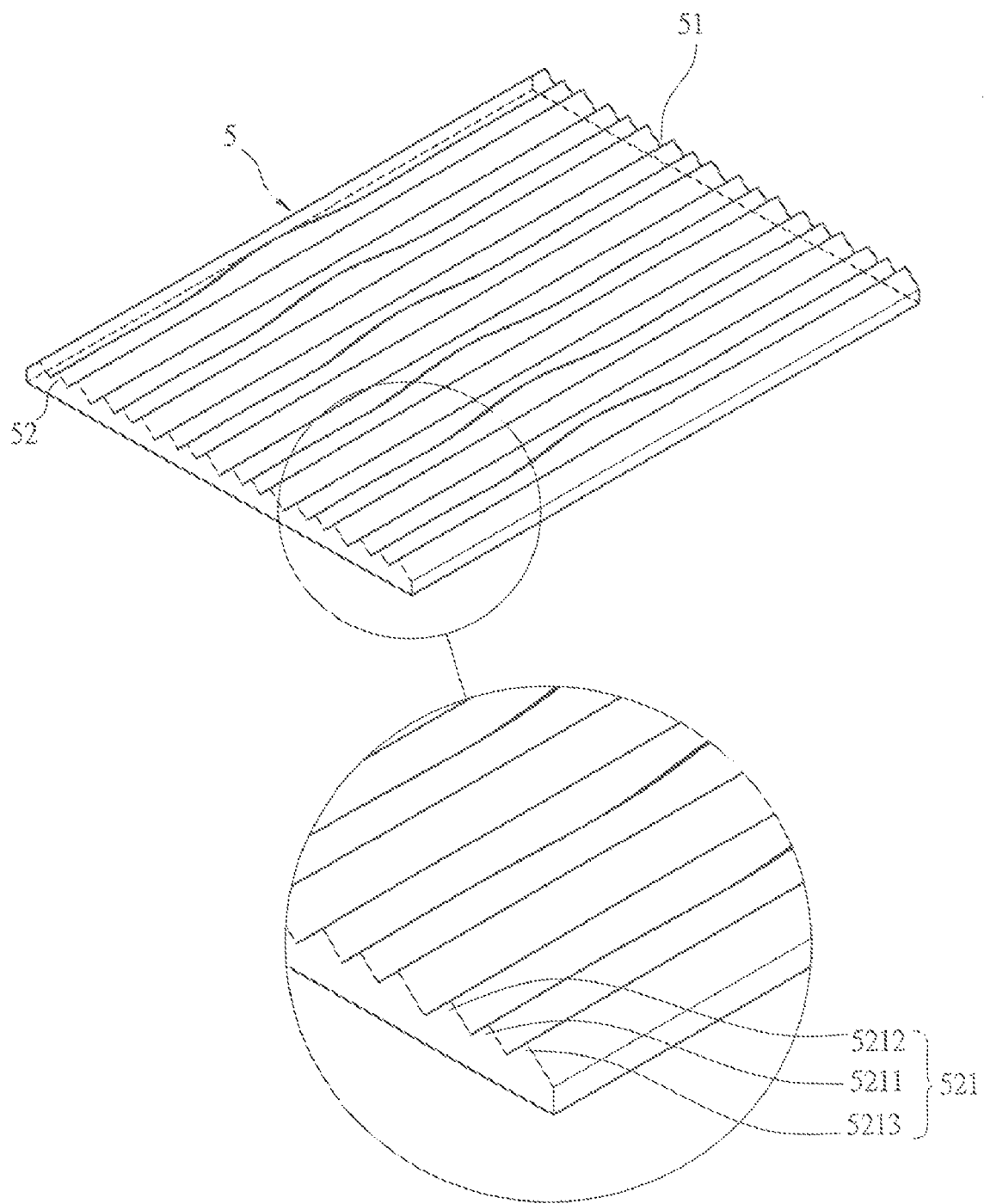
FIG. 30 shows a perspective view of an optic film constructed in accordance with a fifteenth embodiment of the present invention.
Figure 31:
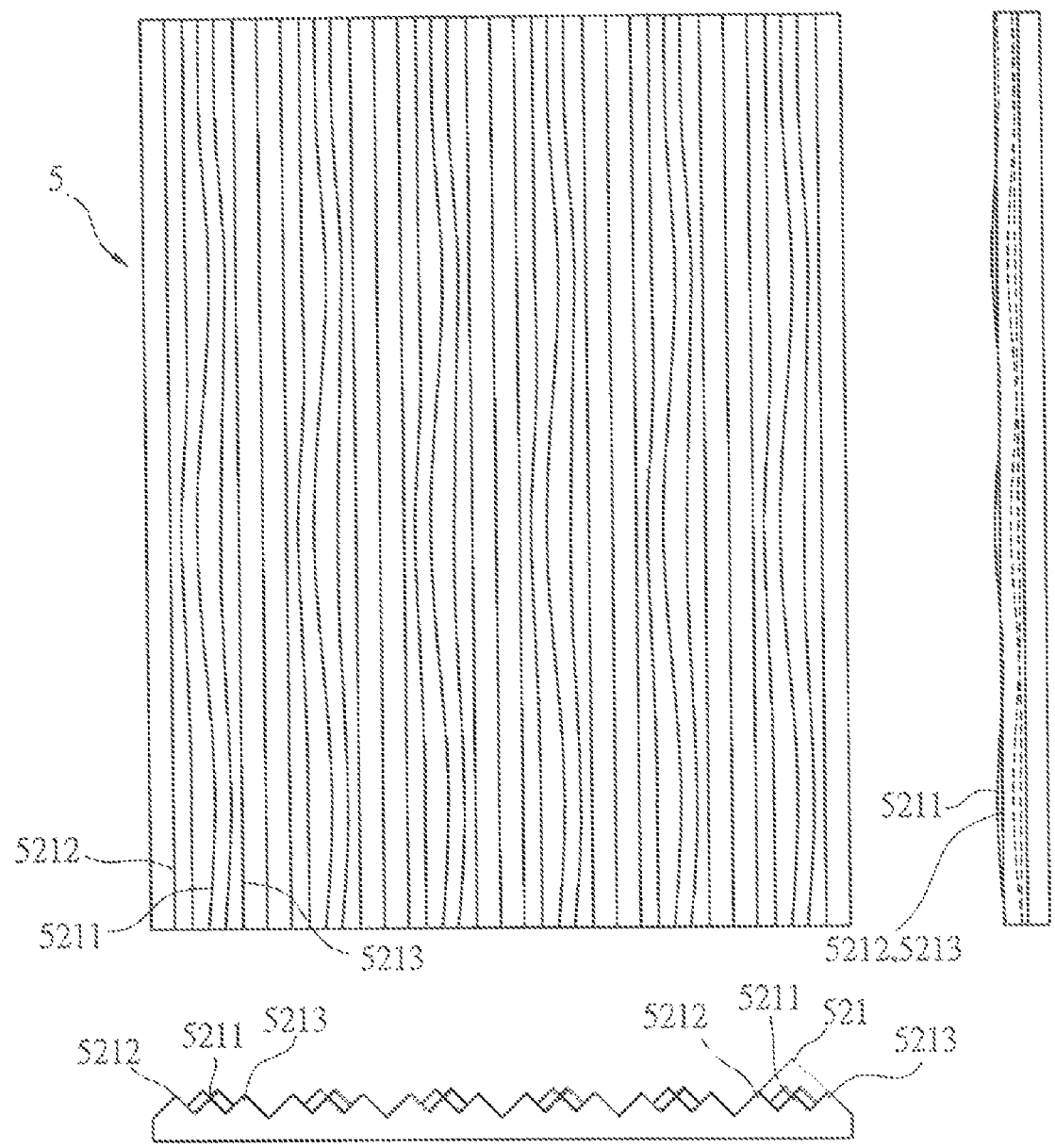
FIG. 31 shows a top plan view, an end view, and a side elevational view of the optic film of FIG. 30.

Referring to FIGS. 30 and 31, to embody the optic film 5 in accordance with a further embodiment of the present invention, a central ridge 5211 of the micro light guide 52 is made both a continuous left-and-right wavy configuration and a continuous up-and-down height-variation configuration, while side ridges 5212, 5213, which are located on opposite sides of the central ridge 5211, are made straight linear. As such, light transmitting through the micro light guide 52 can be of variations, so that the light induces no interference pattern in a liquid crystal display panel when the light passes through thin-film transistors and color filters of the liquid crystal display panel.

Figure 32:
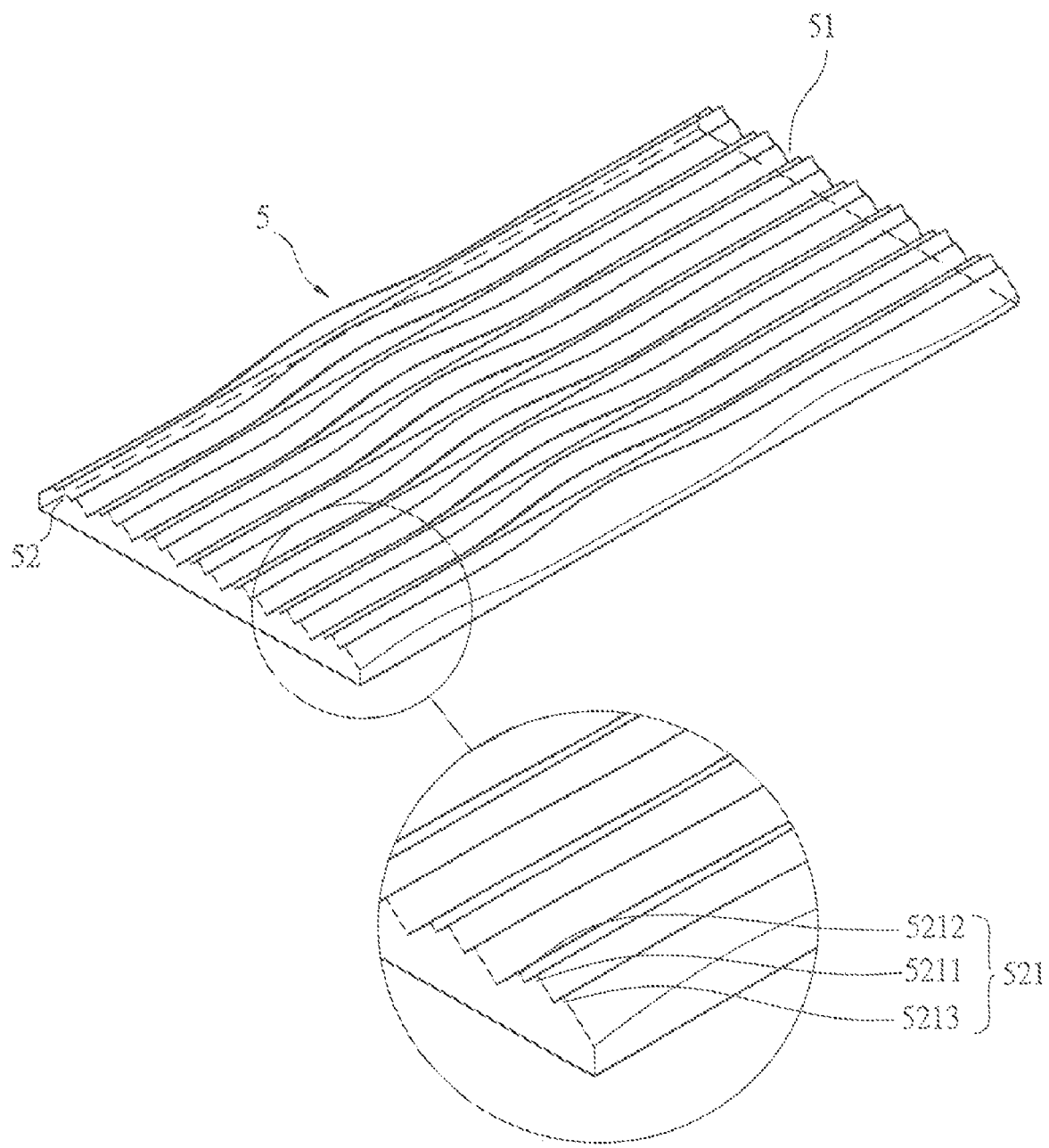
FIG. 32 shows a perspective view of an optic film constructed in accordance with a sixteenth embodiment of the present invention.
Figure 33:
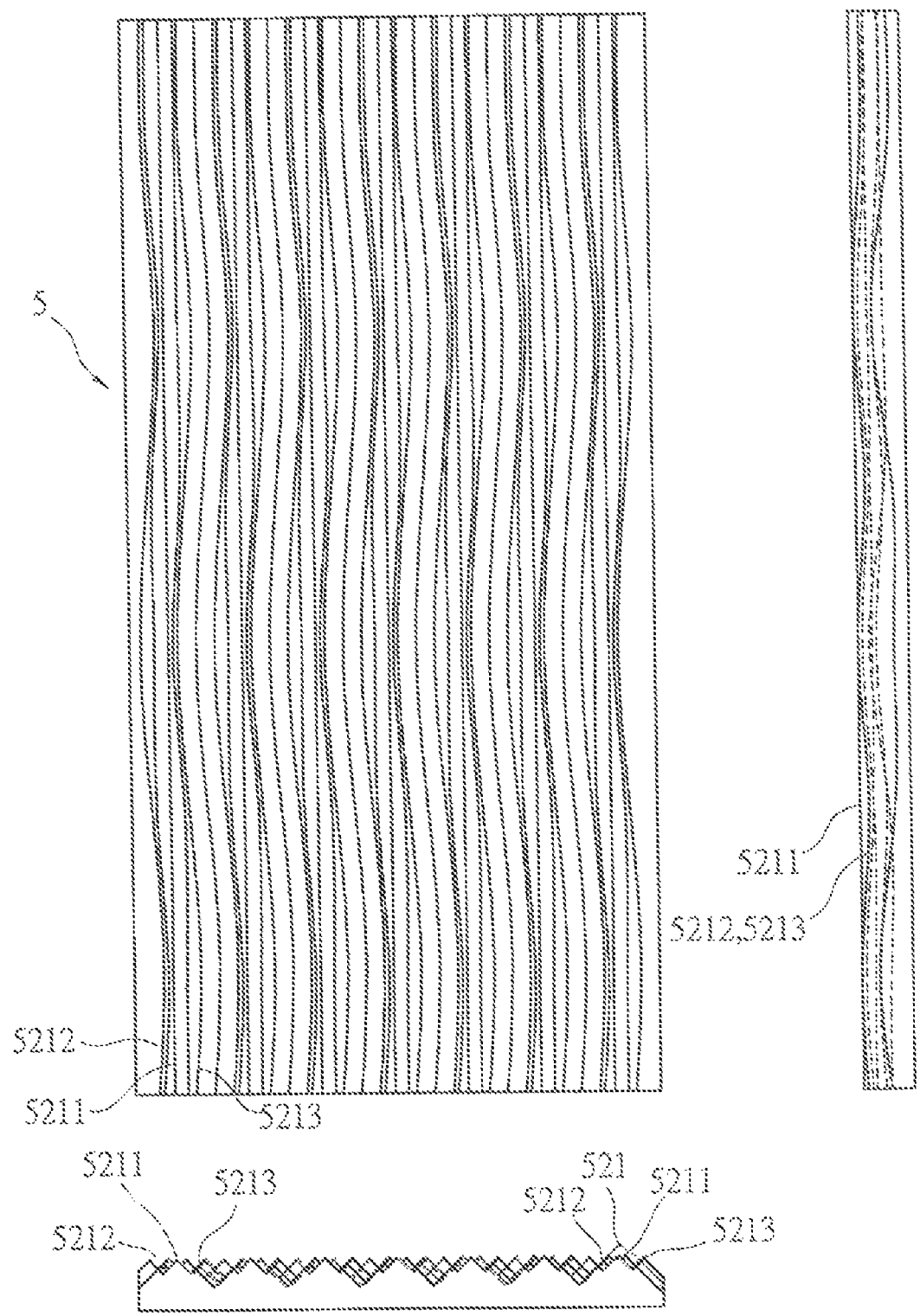
FIG. 33 shows a top plan view, an end view, and a side elevational view of the optic film of FIG. 32.

Referring to FIGS. 32 and 33, to embody the optic film 5 in accordance with a further embodiment of the present invention, a central ridge 5211 of the micro light guide 52 is made straight linear, while side ridges 5212, 5213, which are located on opposite sides of the central ridge 5211, are made both a continuous left-and-right wavy configuration and a continuous up-and-down height-variation configuration. As such, light transmitting through the micro light guide 52 can be of variations, so that the light induces no interference pattern in a liquid crystal display panel when the light passes through thin-film transistors and color filters of the liquid crystal display panel.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A side-edge backlight module comprising:
   a light guide board, having at least a light incidence surface, a reflection surface, and a light emitting surface;
   a reflector film arranged outside the reflection surface of the light guide board;
   an optic film having a surface forming a plurality of micro light guides; and
   a light source arranged outside the light incidence surface of the light guide board; and
   wherein each micro light guide of the optic film comprises at least two ridges of identical height, a first number of the ridges of the micro light guide are of a continuous left-and-right wavy configuration, while a second number of the ridges are of a straight linear configuration.

2. The side-edge backlight module as claimed in claim 1, wherein the first number of the ridges of the micro light guide is of both a continuous left-and-right wavy configuration and a continuous up-and-down height-variation configuration.

3. The side-edge backlight module as claimed in claim 1, wherein the micro light guides and a body of the optic film are made of the same material.

4. The side-edge backlight module as claimed in claim 1, wherein the micro light guides and a body of the optic film are made of different materials.

\* \* \* \* \*